United States Patent
De Benedittis et al.

(10) Patent No.: US 12,294,883 B2
(45) Date of Patent: May 6, 2025

(54) APPARATUS, METHOD, AND COMPUTER PROGRAM

(71) Applicant: Nokia Solutions and Networks Oy, Espoo (FI)

(72) Inventors: Rossella De Benedittis, Ulm (DE); Alfredo Rocchetti, Munich (DE); Jean-Michel Pugeat, Paris (FR)

(73) Assignee: Nokia Solutions and Networks Oy, Espoo (FI)

( * ) Notice: Subject to any disclaimer, the term of this patent is extended or adjusted under 35 U.S.C. 154(b) by 368 days.

(21) Appl. No.: 17/798,136

(22) PCT Filed: Feb. 10, 2020

(86) PCT No.: PCT/EP2020/053276
§ 371 (c)(1),
(2) Date: Aug. 8, 2022

(87) PCT Pub. No.: WO2021/160236
PCT Pub. Date: Aug. 19, 2021

(65) Prior Publication Data
US 2023/0048592 A1    Feb. 16, 2023

(51) Int. Cl.
*H04W 24/10* (2009.01)
*H04W 48/20* (2009.01)
*H04W 56/00* (2009.01)

(52) U.S. Cl.
CPC ........... *H04W 24/10* (2013.01); *H04W 48/20* (2013.01); *H04W 56/001* (2013.01)

(58) Field of Classification Search
CPC .. H04L 5/001; H04W 24/10; H04W 36/0088; H04W 48/20; H04W 56/001
See application file for complete search history.

(56) References Cited

U.S. PATENT DOCUMENTS

2015/0018010 A1    1/2015    Fischer ..................... 455/456.2
2018/0368035 A1    12/2018   Huang et al. ................... 36/94
(Continued)

FOREIGN PATENT DOCUMENTS

CN    102461292 A    5/2012
CN    110035510 A    7/2019
(Continued)

OTHER PUBLICATIONS

"Discussion on measurement gap in NR", ZTE, 3GPP TSG-RAN WG4 Meeting RAN4#84, R4-1708195, Aug. 2017, 6 pages.
(Continued)

*Primary Examiner* — Zhensheng Zhang
(74) *Attorney, Agent, or Firm* — McCarter & English LLP

(57) ABSTRACT

An apparatus including: at least one processor; and at least one memory including computer program code; the at least one memory and the computer program code configured to, with the at least one processor, cause the apparatus at least to: select reference neighbouring cells among a plurality of neighbouring cells of a serving cell, wherein the reference neighboring cells have a same numerology and synchronization signal block burst patterns overlapping in time and with a same periodicity; determine a measurement gap configuration allowing at least one terminal served by the serving cell to measure at least one synchronisation signal block from at least one of the reference neighbouring cells; and provide, to the at least one terminal, the measurement gap configuration.

23 Claims, 14 Drawing Sheets

(56) References Cited

U.S. PATENT DOCUMENTS

2018/0368088 A1    12/2018  Nagaraja et al. ............... 56/5
2019/0306734 A1*   10/2019  Huang ............... H04W 24/08
2019/0364452 A1*   11/2019  Hwang .............. H04W 16/28
2020/0329481 A1*   10/2020  Yi .................. H04W 72/0446

FOREIGN PATENT DOCUMENTS

CN        110431789 A      11/2019
KR       20180108362 A     10/2018
WO    WO-2019/095277 A1    5/2019

OTHER PUBLICATIONS

"Discussion on measurement applicability in mixed numerology in NR", LG Electronics, 3GPP TSG-RAN WG4 Meeting #84bis, R4-1710612, 4 pages.

LG Electronics, "Discussion on measurement applicability in mixed numerology in NR", 3GPP TSG-RAN WG4 Meeting #84bis R4-1710612, Dubrovnik, Croatia, Oct. 9-13, 2017.

* cited by examiner

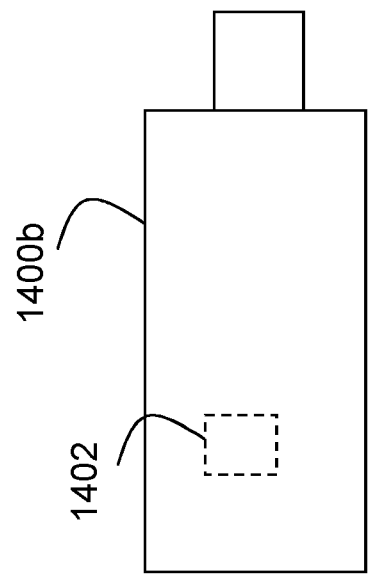
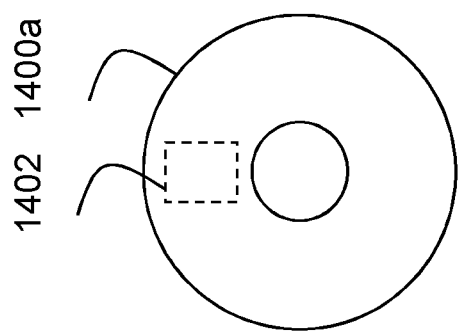
Fig. 14

APPARATUS, METHOD, AND COMPUTER PROGRAM

CROSS REFERENCE TO RELATED APPLICATION

This patent application is a U.S. National Stage application of International Patent Application Number PCT/EP2020/053276 filed Feb. 10, 2020, which is hereby incorporated by reference in its entirety.

FIELD OF THE DISCLOSURE

The present disclosure relates to an apparatus, a method, and a computer program for determining, providing, receiving and/or using a measurement gap configuration allowing at least one terminal served by a serving cell to measure at least one synchronisation signal block burst from at least one reference neighbouring cell.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: select reference neighbouring cells among a plurality of neighbouring cells of a serving cell, wherein the reference neighboring cells have a same numerology and synchronization signal block burst patterns overlapping in time and with a same periodicity; determine a measurement gap configuration allowing at least one terminal served by the serving cell to measure at least one synchronisation signal block from at least one of the reference neighbouring cells; and provide, to the at least one terminal, the measurement gap configuration.

The plurality of neighbouring cells may comprise at least one non-reference neighbouring cell with a different numerology than the reference neighboring cells and/or with a synchronisation signal block pattern not overlapping in time with the synchronisation signal block patterns of the reference neighboring cells and/or with a different periodicity than the synchronisation signal block patterns of the reference neighboring cells.

A synchronisation signal block pattern may comprise a number of synchronisation signal blocks and a synchronisation signal block burst repetition period; and a numerology may comprise a subcarrier spacing.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells; and adjusting the measurement gap configuration to comprise the at least one measurement gap offset allowing the at least one terminal served by the serving cell to measure as many synchronisation signal blocks as possible within at least one synchronisation signal block burst from at least one of the reference neighbouring cells.

The at least one memory and the computer program code may be configured to, with the at least one processor, cause the apparatus at least to: determine a first set of measurement gap offsets based on a set of all possible measurement gap offsets to measure a synchronisation signal block burst from at least one of the reference neighbouring cells; provide, to one of the at least one terminal served by the serving cell, the first set of measurement gap offsets; and receive, from the one of the at least one terminal served by the serving cell, an indication of at least a first measurement gap offset among the first set of measurement gap offsets allowing the one of the at least one terminal served by the serving cell to measure at least one first synchronisation signal block within at least one synchronisation signal block burst from at least one of the reference neighbouring cells.

The first set of measurement gap offsets may comprise the set of all possible measurement gap offsets to measure at least one synchronisation signal block burst from at least one of the reference neighbouring cell.

The first set of measurement gap offsets may comprise part of the set of all possible measurement gap offsets to measure at least one synchronisation signal block burst from at least one of the reference neighbouring cells.

The at least one memory and the computer program code may be configured to, with the at least one processor, cause the apparatus at least to: determine the first set of measurement gap offsets based on a synchronisation signal block burst repetition period and a measurement gap offset step.

The at least one memory and the computer program code may be configured to, with the at least one processor, cause the apparatus at least to: determine the measurement gap offset step based on a synchronisation signal block burst overall duration and a measurement gap length.

The at least one memory and the computer program code may be configured to, with the at least one processor, cause the apparatus at least to: determine the measurement gap offset step so that the synchronisation signal block burst overall duration plus the measurement gap offset step is lower than or equal to the measurement gap length.

The at least one memory and the computer program code may be configured to, with the at least one processor, cause the apparatus at least to: determine a second set of measurement gap offsets based on the first set of measurement gap offsets and the at least one first measurement gap offset; provide, to one of the at least one terminal served by the serving cell, the second set of measurement gap offsets; and receive, from the one of the at least one terminal served by the serving cell, an indication of at least one second measurement gap offset among the second set of measurement gap offsets allowing the one of the at least one terminal served by the serving cell to measure at least one second synchronisation signal block within at least one synchronisation signal block burst from at least one of the reference neighbouring cells.

The second set of measurement gap offsets may comprise the at least one first measurement gap offset and at least one other measurement gap offset in the first set of measurement gap offsets.

At least one of the reference neighbouring cells may be configured to transmit at least one synchronisation signal block associated with an omnidirectional or sectorial beam within at least one synchronisation signal block burst.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell overlapping in time with the at least one synchronisation signal block burst from the at least one of the reference neighbouring cells.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell.

At least one non-reference neighbouring cell may be configured to transmit at least one synchronisation signal block associated with an omnidirectional or sectorial beam within at least one synchronisation signal block burst from the at least one non-reference neighbouring cell, the at least one synchronisation signal block associated with the omnidirectional or sectorial beam overlapping in time with at least one synchronisation signal block burst from at least one of the reference neighbouring cells.

Determining a measurement gap configuration allowing the at least one terminal served by the serving cell to measure at least one synchronisation signal block from the at least one reference neighbouring cell may comprise: determining at least one measurement gap offset allowing the at least one terminal served by the serving cell to measure as many synchronisation signal blocks as possible within at least one synchronisation signal block burst from at least one of the reference neighbouring cells and the at least one synchronisation signal block associated with the omnidirectional or sectorial beam within at least one synchronisation signal block burst from the at least one non-reference neighbouring cell.

According to an aspect there is provided an apparatus comprising means for: selecting reference neighbouring cells among a plurality of neighbouring cells of a serving cell, wherein the reference neighboring cells have a same numerology and synchronization signal block burst patterns overlapping in time and with a same periodicity; determining a measurement gap configuration allowing at least one terminal served by the serving cell to measure at least one synchronisation signal block from at least one of the reference neighbouring cells; and providing, to the at least one terminal, the measurement gap configuration.

The plurality of neighbouring cells may comprise at least one non-reference neighbouring cell with a different numerology than the reference neighboring cells and/or with a synchronisation signal block pattern not overlapping in time with the synchronisation signal block patterns of the reference neighboring cells and/or with a different periodicity than the synchronisation signal block patterns of the reference neighboring cells.

A synchronisation signal block pattern may comprise a number of synchronisation signal blocks and a synchronisation signal block burst repetition period; and a numerology may comprise a subcarrier spacing.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells; and adjusting the measurement gap configuration to comprise the at least one measurement gap offset allowing the at least one terminal served by the serving cell to measure as many synchronisation signal blocks as possible within at least one synchronisation signal block burst from at least one of the reference neighbouring cells.

The apparatus may comprises means for: determining a first set of measurement gap offsets based on a set of all possible measurement gap offsets to measure a synchronisation signal block burst from at least one of the reference neighbouring cells; providing, to one of the at least one terminal served by the serving cell, the first set of measurement gap offsets; and receiving, from the one of the at least one terminal served by the serving cell, an indication of at least a first measurement gap offset among the first set of measurement gap offsets allowing the one of the at least one terminal served by the serving cell to measure at least one first synchronisation signal block within at least one synchronisation signal block burst from at least one of the reference neighbouring cells.

The first set of measurement gap offsets may comprise the set of all possible measurement gap offsets to measure at least one synchronisation signal block burst from at least one of the reference neighbouring cell.

The first set of measurement gap offsets may comprise part of the set of all possible measurement gap offsets to measure at least one synchronisation signal block burst from at least one of the reference neighbouring cells.

The apparatus may comprises means for: determining the first set of measurement gap offsets based on a synchronisation signal block burst repetition period and a measurement gap offset step.

The apparatus may comprises means for: determining the measurement gap offset step based on a synchronisation signal block burst overall duration and a measurement gap length.

The apparatus may comprises means for: determining the measurement gap offset step so that the synchronisation signal block burst overall duration plus the measurement gap offset step is lower than or equal to the measurement gap length.

The apparatus may comprises means for: determining a second set of measurement gap offsets based on the first set of measurement gap offsets and the at least one first measurement gap offset; providing, to one of the at least one terminal served by the serving cell, the second set of measurement gap offsets; and receiving, from the one of the at least one terminal served by the serving cell, an indication of at least one second measurement gap offset among the second set of measurement gap offsets allowing the one of the at least one terminal served by the serving cell to measure at least one second synchronisation signal block within at least one synchronisation signal block burst from at least one of the reference neighbouring cells.

The second set of measurement gap offsets may comprise the at least one first measurement gap offset and at least one other measurement gap offset in the first set of measurement gap offsets.

At least one of the reference neighbouring cells may be configured to transmit at least one synchronisation signal block associated with an omnidirectional or sectorial beam within at least one synchronisation signal block burst.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell overlapping in time with the at least one synchronisation signal block burst from the at least one of the reference neighbouring cells.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell.

At least one non-reference neighbouring cell may be configured to transmit at least one synchronisation signal block associated with an omnidirectional or sectorial beam within at least one synchronisation signal block burst from the at least one non-reference neighbouring cell, the at least one synchronisation signal block associated with the omnidirectional or sectorial beam overlapping in time with at least one synchronisation signal block burst from at least one of the reference neighbouring cells.

Determining a measurement gap configuration allowing the at least one terminal served by the serving cell to measure at least one synchronisation signal block from the at least one reference neighbouring cell may comprise: determining at least one measurement gap offset allowing the at least one terminal served by the serving cell to measure as many synchronisation signal blocks as possible within at least one synchronisation signal block burst from at least one of the reference neighbouring cells and the at least one synchronisation signal block associated with the omnidirectional or sectorial beam within at least one synchronisation signal block burst from the at least one non-reference neighbouring cell.

According to an aspect there is provided an apparatus comprising circuitry configured to: select reference neighbouring cells among a plurality of neighbouring cells of a serving cell, wherein the reference neighboring cells have a same numerology and synchronization signal block burst patterns overlapping in time and with a same periodicity; determine a measurement gap configuration allowing at least one terminal served by the serving cell to measure at least one synchronisation signal block from at least one of the reference neighbouring cells; and provide, to the at least one terminal, the measurement gap configuration.

The plurality of neighbouring cells may comprise at least one non-reference neighbouring cell with a different numerology than the reference neighboring cells and/or with a synchronisation signal block pattern not overlapping in time with the synchronisation signal block patterns of the reference neighboring cells and/or with a different periodicity than the synchronisation signal block patterns of the reference neighboring cells.

A synchronisation signal block pattern may comprise a number of synchronisation signal blocks and a synchronisation signal block burst repetition period; and a numerology may comprise a subcarrier spacing.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells; and adjusting the measurement gap configuration to comprise the at least one measurement gap offset allowing the at least one terminal served by the serving cell to measure as many synchronisation signal blocks as possible within at least one synchronisation signal block burst from at least one of the reference neighbouring cells.

The apparatus may comprise circuitry configured to: determine a first set of measurement gap offsets based on a set of all possible measurement gap offsets to measure a synchronisation signal block burst from at least one of the reference neighbouring cells; provide, to one of the at least one terminal served by the serving cell, the first set of measurement gap offsets; and receive, from the one of the at least one terminal served by the serving cell, an indication of at least a first measurement gap offset among the first set of measurement gap offsets allowing the one of the at least one terminal served by the serving cell to measure at least one first synchronisation signal block within at least one synchronisation signal block burst from at least one of the reference neighbouring cells.

The first set of measurement gap offsets may comprise the set of all possible measurement gap offsets to measure at least one synchronisation signal block burst from at least one of the reference neighbouring cell.

The first set of measurement gap offsets may comprise part of the set of all possible measurement gap offsets to measure at least one synchronisation signal block burst from at least one of the reference neighbouring cells.

The apparatus may comprise circuitry configured to: determine the first set of measurement gap offsets based on a synchronisation signal block burst repetition period and a measurement gap offset step.

The apparatus may comprise circuitry configured to: determine the measurement gap offset step based on a synchronisation signal block burst overall duration and a measurement gap length.

The apparatus may comprise circuitry configured to: determine the measurement gap offset step so that the synchronisation signal block burst overall duration plus the measurement gap offset step is lower than or equal to the measurement gap length.

The apparatus may comprise circuitry configured to: determine a second set of measurement gap offsets based on the first set of measurement gap offsets and the at least one first measurement gap offset; provide, to one of the at least one terminal served by the serving cell, the second set of measurement gap offsets; and receive, from the one of the at least one terminal served by the serving cell, an indication of at least one second measurement gap offset among the second set of measurement gap offsets allowing the one of the at least one terminal served by the serving cell to measure at least one second synchronisation signal block within at least one synchronisation signal block burst from at least one of the reference neighbouring cells.

The second set of measurement gap offsets may comprise the at least one first measurement gap offset and at least one other measurement gap offset in the first set of measurement gap offsets.

At least one of the reference neighbouring cells may be configured to transmit at least one synchronisation signal block associated with an omnidirectional or sectorial beam within at least one synchronisation signal block burst.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell overlapping in time with the at least one synchronisation signal block burst from the at least one of the reference neighbouring cells.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell.

At least one non-reference neighbouring cell may be configured to transmit at least one synchronisation signal block associated with an omnidirectional or sectorial beam within at least one synchronisation signal block burst from the at least one non-reference neighbouring cell, the at least one synchronisation signal block associated with the omnidirectional or sectorial beam overlapping in time with at least one synchronisation signal block burst from at least one of the reference neighbouring cells.

Determining a measurement gap configuration allowing the at least one terminal served by the serving cell to measure at least one synchronisation signal block from the at least one reference neighbouring cell may comprise: determining at least one measurement gap offset allowing the at least one terminal served by the serving cell to measure as many synchronisation signal blocks as possible within at least one synchronisation signal block burst from at least one of the reference neighbouring cells and the at least one synchronisation signal block associated with the omnidirectional or sectorial beam within at least one synchronisation signal block burst from the at least one non-reference neighbouring cell.

According to an aspect there is provided a method comprising: selecting reference neighbouring cells among a plurality of neighbouring cells of a serving cell, wherein the reference neighboring cells have a same numerology and synchronization signal block burst patterns overlapping in time and with a same periodicity; determining a measurement gap configuration allowing at least one terminal served by the serving cell to measure at least one synchronisation signal block from at least one of the reference neighbouring cells; and providing, to the at least one terminal, the measurement gap configuration.

The plurality of neighbouring cells may comprise at least one non-reference neighbouring cell with a different numerology than the reference neighboring cells and/or with a synchronisation signal block pattern not overlapping in time with the synchronisation signal block patterns of the reference neighboring cells and/or with a different periodicity than the synchronisation signal block patterns of the reference neighboring cells.

A synchronisation signal block pattern may comprise a number of synchronisation signal blocks and a synchronisation signal block burst repetition period; and a numerology may comprise a subcarrier spacing.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells; and adjusting the measurement gap configuration to comprise the at least one measurement gap offset allowing the at least one terminal served by the serving cell to measure as many synchronisation signal blocks as possible within at least one synchronisation signal block burst from at least one of the reference neighbouring cells.

The method may comprise: determining a first set of measurement gap offsets based on a set of all possible measurement gap offsets to measure a synchronisation signal block burst from at least one of the reference neighbouring cells; providing, to one of the at least one terminal served by the serving cell, the first set of measurement gap offsets; and receiving, from the one of the at least one terminal served by the serving cell, an indication of at least a first measurement gap offset among the first set of measurement gap offsets allowing the one of the at least one terminal served by the serving cell to measure at least one first synchronisation signal block within at least one synchronisation signal block burst from at least one of the reference neighbouring cells.

The first set of measurement gap offsets may comprise the set of all possible measurement gap offsets to measure at least one synchronisation signal block burst from at least one of the reference neighbouring cell.

The first set of measurement gap offsets may comprise part of the set of all possible measurement gap offsets to measure at least one synchronisation signal block burst from at least one of the reference neighbouring cells.

The method may comprise: determining the first set of measurement gap offsets based on a synchronisation signal block burst repetition period and a measurement gap offset step.

The method may comprise: determining the measurement gap offset step based on a synchronisation signal block burst overall duration and a measurement gap length.

The method may comprise: determining the measurement gap offset step so that the synchronisation signal block burst overall duration plus the measurement gap offset step is lower than or equal to the measurement gap length.

The method may comprise: determining a second set of measurement gap offsets based on the first set of measurement gap offsets and the at least one first measurement gap offset; providing, to one of the at least one terminal served by the serving cell, the second set of measurement gap offsets; and receiving, from the one of the at least one terminal served by the serving cell, an indication of at least one second measurement gap offset among the second set of measurement gap offsets allowing the one of the at least one terminal served by the serving cell to measure at least one second synchronisation signal block within at least one synchronisation signal block burst from at least one of the reference neighbouring cells.

The second set of measurement gap offsets may comprise the at least one first measurement gap offset and at least one other measurement gap offset in the first set of measurement gap offsets.

At least one of the reference neighbouring cells may be configured to transmit at least one synchronisation signal block associated with an omnidirectional or sectorial beam within at least one synchronisation signal block burst.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell overlapping in time with the at least one synchronisation signal block burst from the at least one of the reference neighbouring cells.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell.

At least one non-reference neighbouring cell may be configured to transmit at least one synchronisation signal block associated with an omnidirectional or sectorial beam within at least one synchronisation signal block burst from the at least one non-reference neighbouring cell, the at least one synchronisation signal block associated with the omnidirectional or sectorial beam overlapping in time with at least one synchronisation signal block burst from at least one of the reference neighbouring cells.

Determining a measurement gap configuration allowing the at least one terminal served by the serving cell to measure at least one synchronisation signal block from the at least one reference neighbouring cell may comprise: determining at least one measurement gap offset allowing the at least one terminal served by the serving cell to measure as many synchronisation signal blocks as possible within at least one synchronisation signal block burst from at least one of the reference neighbouring cells and the at least one synchronisation signal block associated with the omnidirectional or sectorial beam within at least one synchronisation signal block burst from the at least one non-reference neighbouring cell.

According to an aspect there is provided a computer program comprising computer executable code which when run on at least one processor is configured to: select reference neighbouring cells among a plurality of neighbouring cells of a serving cell, wherein the reference neighbouring cells have a same numerology and synchronization signal block burst patterns overlapping in time and with a same periodicity; determine a measurement gap configuration allowing at least one terminal served by the serving cell to measure at least one synchronisation signal block from at least one of the reference neighbouring cells; and provide, to the at least one terminal, the measurement gap configuration.

The plurality of neighbouring cells may comprise at least one non-reference neighbouring cell with a different numerology than the reference neighboring cells and/or with a synchronisation signal block pattern not overlapping in time with the synchronisation signal block patterns of the reference neighboring cells and/or with a different periodicity than the synchronisation signal block patterns of the reference neighboring cells.

A synchronisation signal block pattern may comprise a number of synchronisation signal blocks and a synchronisation signal block burst repetition period; and a numerology may comprise a subcarrier spacing.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells; and adjusting the measurement gap configuration to comprise the at least one measurement gap offset allowing the at least one terminal served by the serving cell to measure as many synchronisation signal blocks as possible within at least one synchronisation signal block burst from at least one of the reference neighbouring cells.

The computer program may comprise computer executable code which when run on at least one processor is configured to: determine a first set of measurement gap offsets based on a set of all possible measurement gap offsets to measure a synchronisation signal block burst from at least one of the reference neighbouring cells; provide, to one of the at least one terminal served by the serving cell, the first set of measurement gap offsets; and receive, from the one of the at least one terminal served by the serving cell, an indication of at least a first measurement gap offset among the first set of measurement gap offsets allowing the one of the at least one terminal served by the serving cell to measure at least one first synchronisation signal block within at least one synchronisation signal block burst from at least one of the reference neighbouring cells.

The first set of measurement gap offsets may comprise the set of all possible measurement gap offsets to measure at least one synchronisation signal block burst from at least one of the reference neighbouring cell.

The first set of measurement gap offsets may comprise part of the set of all possible measurement gap offsets to measure at least one synchronisation signal block burst from at least one of the reference neighbouring cells.

The computer program may comprise computer executable code which when run on at least one processor is configured to: determine the first set of measurement gap offsets based on a synchronisation signal block burst repetition period and a measurement gap offset step.

The computer program may comprise computer executable code which when run on at least one processor is configured to: determine the measurement gap offset step based on a synchronisation signal block burst overall duration and a measurement gap length.

The computer program may comprise computer executable code which when run on at least one processor is configured to: determine the measurement gap offset step so that the synchronisation signal block burst overall duration plus the measurement gap offset step is lower than or equal to the measurement gap length.

The computer program may comprise computer executable code which when run on at least one processor is configured to: determine a second set of measurement gap offsets based on the first set of measurement gap offsets and the at least one first measurement gap offset; provide, to one of the at least one terminal served by the serving cell, the second set of measurement gap offsets; and receive, from the one of the at least one terminal served by the serving cell, an indication of at least one second measurement gap offset among the second set of measurement gap offsets allowing the one of the at least one terminal served by the serving cell to measure at least one second synchronisation signal block within at least one synchronisation signal block burst from at least one of the reference neighbouring cells.

The second set of measurement gap offsets may comprise the at least one first measurement gap offset and at least one other measurement gap offset in the first set of measurement gap offsets.

At least one of the reference neighbouring cells may be configured to transmit at least one synchronisation signal block associated with an omnidirectional or sectorial beam within at least one synchronisation signal block burst.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell overlapping in time with the at least one synchronisation signal block burst from the at least one of the reference neighbouring cells.

Determining the measurement gap configuration allowing the at least one terminal served by the serving cell to measure at least one synchronisation signal block from at least one of the reference neighbouring cells may comprise: determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non-reference neighbouring cell.

At least one non-reference neighbouring cell may be configured to transmit at least one synchronisation signal block associated with an omnidirectional or sectorial beam within at least one synchronisation signal block burst from the at least one non-reference neighbouring cell, the at least one synchronisation signal block associated with the omnidirectional or sectorial beam overlapping in time with at least one synchronisation signal block burst from at least one of the reference neighbouring cells.

Determining a measurement gap configuration allowing the at least one terminal served by the serving cell to measure at least one synchronisation signal block from the at least one reference neighbouring cell may comprise: determining at least one measurement gap offset allowing the at least one terminal served by the serving cell to measure as many synchronisation signal blocks as possible within at least one synchronisation signal block burst from at least one of the reference neighbouring cells and the at least one synchronisation signal block associated with the omnidirectional or sectorial beam within at least one synchronisation signal block burst from the at least one non-reference neighbouring cell.

According to an aspect there is provided an apparatus comprising at least one processor and at least one memory including computer code for one or more programs, the at least one memory and the computer code configured, with the at least one processor, to cause the apparatus at least to: receive, from a base station providing a serving cell, a measurement gap configuration allowing at least one terminal served by the serving cell to measure at least one synchronisation signal block from at least one of reference neighbouring cells selected among a plurality of neighbouring cells; and use the measurement gap configuration to measure at least one synchronisation signal block from at least one of the reference neighbouring cells.

The at least one memory and the computer program code may be configured to, with the at least one processor, cause the apparatus at least to: receive, from the base station, a first set of measurement gap offsets determined based on a set of all possible measurement gap offsets to measure at least one synchronisation signal block from at least one of the reference neighbouring cells; and provide, to the base station, an indication of at least one first measurement gap offset among the first set of measurement gap offsets allowing the apparatus to measure at least one first synchronisation signal block within at least one synchronisation signal block burst from at least one of the reference neighbouring cells.

The at least one memory and the computer program code may be configured to, with the at least one processor, cause the apparatus at least to: receive, from the base station, a second set of measurement gap offsets determined based on the first set of measurement gap offsets and the at least one first measurement gap offset; and provide, to the base station, an indication of at least one second measurement gap offset among the second set of measurement gap offsets allowing the apparatus to measure at least one second synchronisation signal block within at least one synchronisation signal block burst from at least one of the reference neighbouring cells.

According to an aspect there is provided an apparatus comprising means for: receiving, from a base station providing a serving cell, a measurement gap configuration allowing at least one terminal served by the serving cell to measure at least one synchronisation signal block from at least one of reference neighbouring cells selected among a plurality of neighbouring cells; and using the measurement gap configuration to measure at least one synchronisation signal block from at least one of the reference neighbouring cells.

The apparatus may comprise means for: receiving, from the base station, a first set of measurement gap offsets determined based on a set of all possible measurement gap offsets to measure at least one synchronisation signal block from at least one of the reference neighbouring cells; and providing, to the base station, an indication of at least one first measurement gap offset among the first set of measurement gap offsets allowing the apparatus to measure at least one first synchronisation signal block within at least one synchronisation signal block burst from at least one of the reference neighbouring cells.

The apparatus may comprise means for: receiving, from the base station, a second set of measurement gap offsets determined based on the first set of measurement gap offsets and the at least one first measurement gap offset; and providing, to the base station, an indication of at least one second measurement gap offset among the second set of measurement gap offsets allowing the apparatus to measure at least one second synchronisation signal block within at least one synchronisation signal block burst from at least one of the reference neighbouring cells.

According to an aspect there is provided an apparatus comprising circuitry configured to: receive, from a base station providing a serving cell, a measurement gap configuration allowing at least one terminal served by the serving cell to measure at least one synchronisation signal block from at least one of reference neighbouring cells selected among a plurality of neighbouring cells; and use the measurement gap configuration to measure at least one synchronisation signal block from at least one of the reference neighbouring cells.

The apparatus may comprise circuitry configured to: receive, from the base station, a first set of measurement gap offsets determined based on a set of all possible measurement gap offsets to measure at least one synchronisation signal block from at least one of the reference neighbouring cells; and provide, to the base station, an indication of at least one first measurement gap offset among the first set of measurement gap offsets allowing the apparatus to measure at least one first synchronisation signal block within at least one synchronisation signal block burst from at least one of the reference neighbouring cells.

The apparatus may comprise circuitry configured to: receive, from the base station, a second set of measurement gap offsets determined based on the first set of measurement gap offsets and the at least one first measurement gap offset; and provide, to the base station, an indication of at least one second measurement gap offset among the second set of measurement gap offsets allowing the apparatus to measure at least one second synchronisation signal block within at least one synchronisation signal block burst from at least one of the reference neighbouring cells.

According to an aspect there is provided a method comprising: receiving, from a base station providing a serving cell, a measurement gap configuration allowing at least one terminal served by the serving cell to measure at least one synchronisation signal block from at least one of reference neighbouring cells selected among a plurality of neighbouring cells; and using the measurement gap configuration to measure at least one synchronisation signal block from at least one of the reference neighbouring cells.

The method may comprise: receiving, from the base station, a first set of measurement gap offsets determined based on a set of all possible measurement gap offsets to measure at least one synchronisation signal block from at least one of the reference neighbouring cells; and providing, to the base station, an indication of at least one first measurement gap offset among the first set of measurement gap offsets allowing the apparatus to measure at least one first synchronisation signal block within at least one synchronisation signal block burst from at least one of the reference neighbouring cells.

The method may comprise: receiving, from the base station, a second set of measurement gap offsets determined based on the first set of measurement gap offsets and the at least one first measurement gap offset; and providing, to the base station, an indication of at least one second measurement gap offset among the second set of measurement gap offsets allowing the apparatus to measure at least one second synchronisation signal block within at least one synchronisation signal block burst from at least one of the reference neighbouring cells.

According to an aspect there is provided a computer program comprising computer executable code which when run on at least one processor is configured to: receive, from a base station providing a serving cell, a measurement gap configuration allowing at least one terminal served by the serving cell to measure at least one synchronisation signal block from at least one of reference neighbouring cells selected among a plurality of neighbouring cells; and use the measurement gap configuration to measure at least one synchronisation signal block from at least one of the reference neighbouring cells.

The computer program may comprise computer executable code which when run on at least one processor is configured to: receive, from the base station, a first set of measurement gap offsets determined based on a set of all possible measurement gap offsets to measure at least one synchronisation signal block from at least one of the reference neighbouring cells; and provide, to the base station, an indication of at least one first measurement gap offset among the first set of measurement gap offsets allowing the apparatus to measure at least one first synchronisation signal block within at least one synchronisation signal block burst from at least one of the reference neighbouring cells.

The computer program may comprise computer executable code which when run on at least one processor is configured to: receive, from the base station, a second set of measurement gap offsets determined based on the first set of measurement gap offsets and the at least one first measurement gap offset; and provide, to the base station, an indication of at least one second measurement gap offset among the second set of measurement gap offsets allowing the apparatus to measure at least one second synchronisation signal block within at least one synchronisation signal block burst from at least one of the reference neighbouring cells.

According to an aspect, there is provided a computer readable medium comprising program instructions stored thereon for performing at least one of the above methods. According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AUSF: Authentication Server Function
AMF: Access Management Function
BRP: Burst Repetition Period
BS: Base Station
CU: Centralized Unit
DN: Data Network
DU: Distributed Unit
eNB: eNodeB
FDD: Frequency Division Duplex
FR1: Frequency Range 1 as defined in TS 38.101-3: 410 to 7125 MHz
FR2: Frequency Range 2 as defined in TS 38.101-3: 24250 to 52600 MHz
gNB: gNodeB
GNSS: Global Navigation Satellite System
GSM: Global System for Mobile communication
HSS: Home Subscriber Server
IoT: Internet of Things
LTE: Long Term Evolution
MG: Measurement Gap
MGL: Measurement Gap Length
MGRP: Measurement Gap Repetition Period
MGO: Measurement Gap Offset
MGOS: Measurement Gap Offset Step
NEF: Network Exposure Function
NR: New radio
MS: Mobile Station
MTC: Machine Type Communication
PBCH: Physical Broadcast channel
PCell: Primary Cell
PCI: Physical Cell Identity
PSS: Primary Synchronisation Signal
PUCCH: Physical Uplink Control Channel
RAM: Random Access Memory
RAN: Radio Access Network
RF: Radio Frequency
ROM: Read Only Memory
RRC: Radio Resource Control
SFN: System Frame Number
SMF: Session Management Function
SS: Synchronisation Signal
SSB: Synchronisation Signal Block
SSBB: Synchronisation Signal Block Burst
SSBBD: Synchronisation Signal Block Burst Duration
SSBBOD: Synchronisation Signal Block Burst Overall Duration
SSBBRP: Synchronisation Signal Block Burst Repetition Period
SSBD: Synchronisation Signal Block Duration
SSBO: Synchronisation Signal Block Offset
SSBL: Synchronisation Signal Block Length
SSBRP: Synchronisation Signal Block Repetition Period
SSS: Secondary Synchronisation Signal
TDD: Time Division Duplex
TS: Time to switch
UDM: User Data Management
UE: User Equipment
UMTS: Universal Mobile Telecommunication System
USB: Universal
3GPP: $3^{rd}$ Generation Partnership Project
5G: $5^{th}$ Generation
5GC: 5G Core network
5GRAN: 5G Radio Access Network
5GS: 5G System

BRIEF DESCRIPTION OF THE FIGURES

Embodiments will now be described, by way of example only, with reference to the accompanying Figures in which:

FIG. 14 shows a schematic representation of a non-volatile memory medium storing instructions which when executed by a processor allow a processor to perform one or more of the steps of the method of FIGS. 12 and 13.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
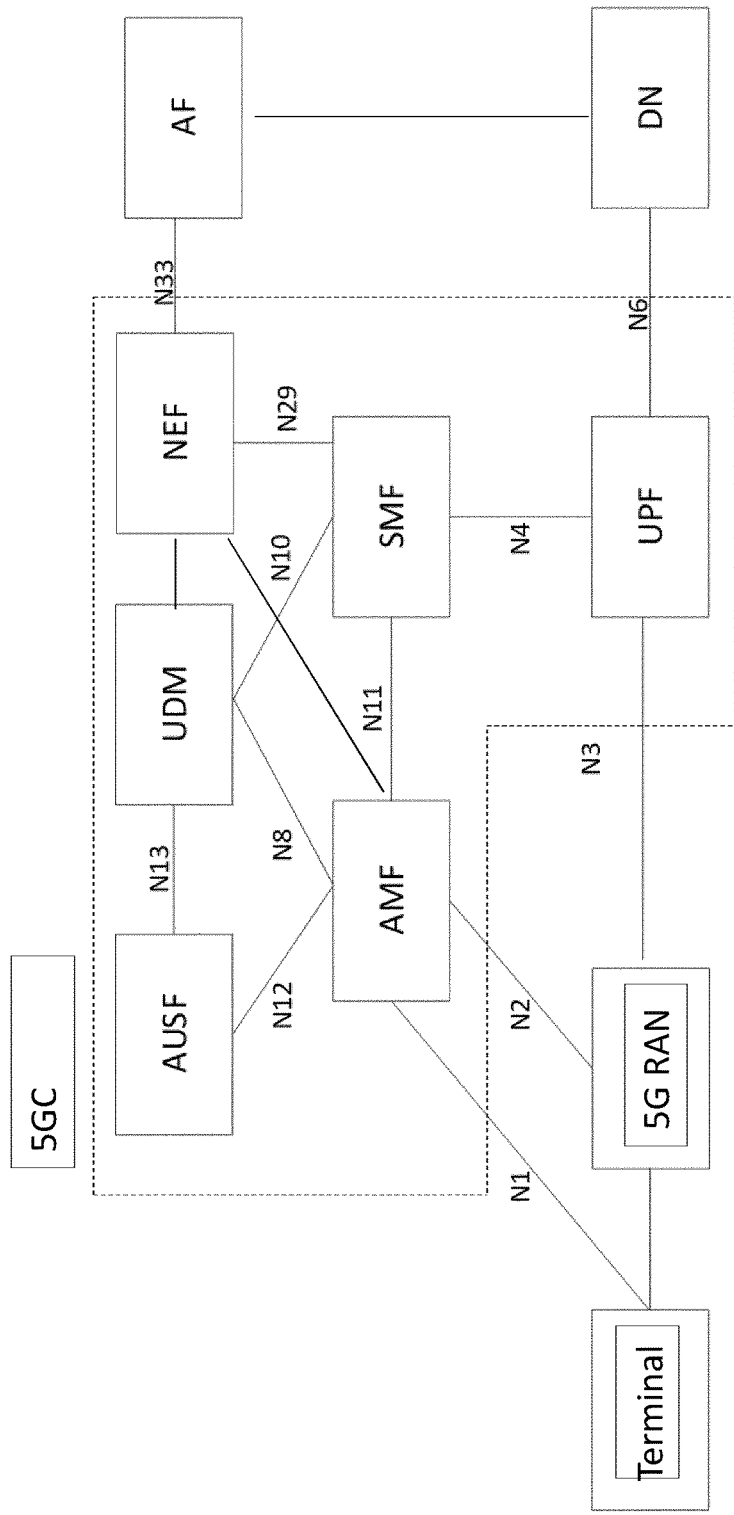
FIG. 1 shows a schematic representation of a 5G system.

FIG. 1 shows a schematic representation of a 5G system (5GS). The 5GS may comprise a terminal, a 5G radio access network (5GRAN), a 5G core network (5GC), one or more application function (AF) and one or more data networks (DN).

The 5GRAN may comprise one or more gNodeB (GNB) distributed unit functions connected to one or more gNodeB (GNB) centralized unit functions.

The 5GC may comprise an access management function (AMF), a session management function (SMF), an authentication server function (AUSF), a user data management (UDM), a user plane function (UPF) and/or a network exposure function (NEF).

Figure 2:
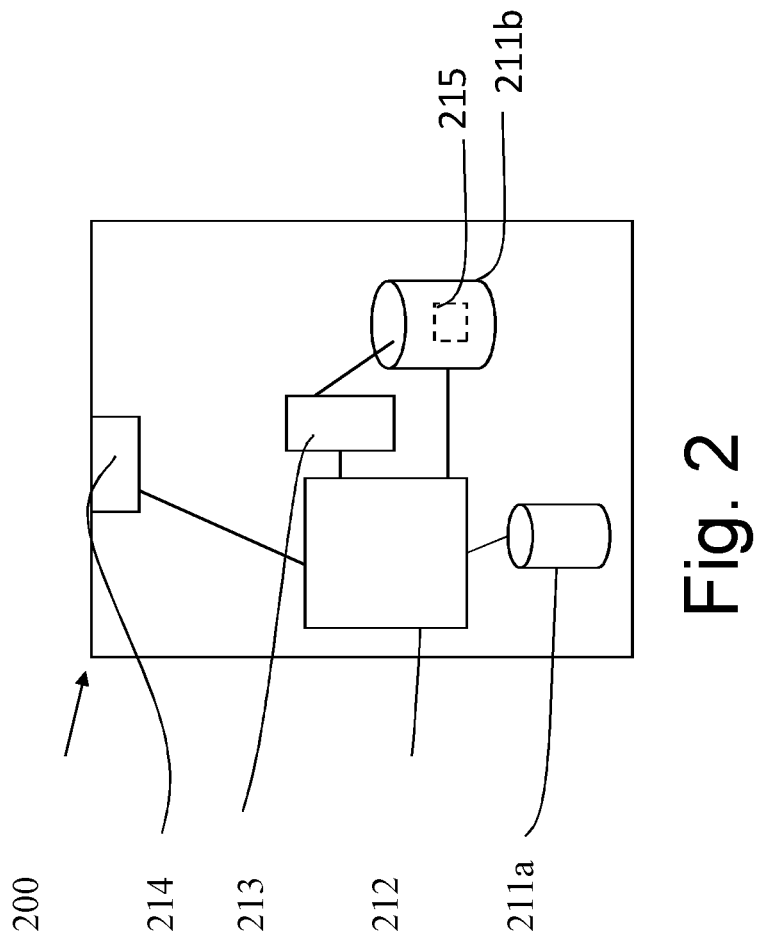
FIG. 2 shows a schematic representation of a control apparatus.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
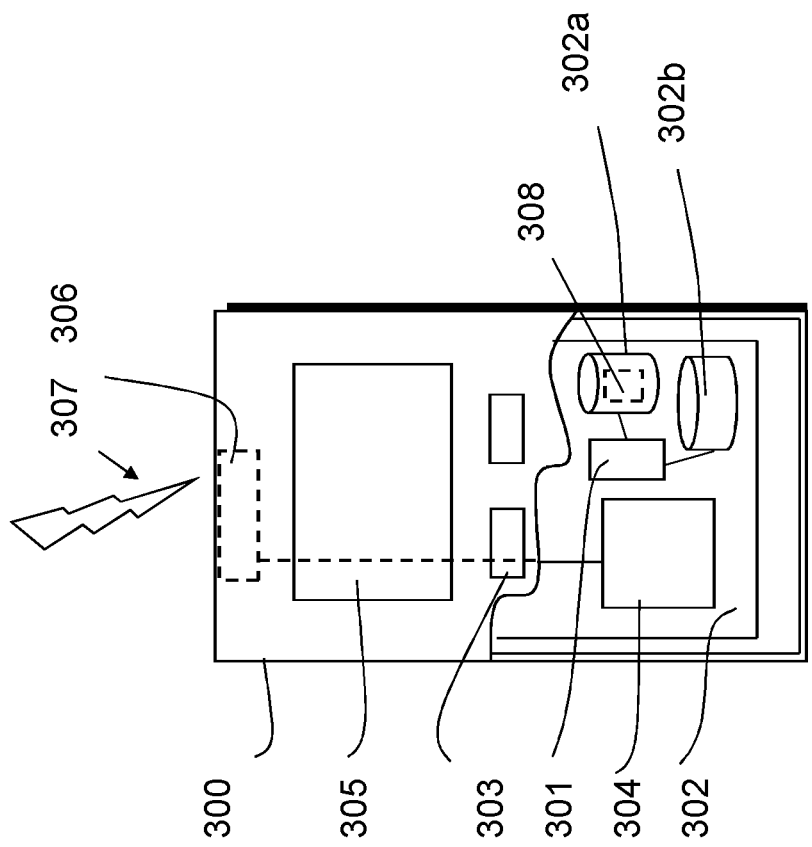
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

One or more of examples described herein relate to the detection by a user equipment (UE) of synchronisation signals (SS) transmitted by one or more neighbouring cells (e.g. NR cells) via measurement gaps (MG) whilst being connected to a serving cell (e.g. LTE cell) or primary cell (PCell).

Although in the following the one or more neighbouring cells are NR cells it will be understood that the one or more neighbouring cells may be different type of cells. Likewise, although in the following the serving cell is a LTE cell it will be understood that the serving cell may be different type of cell.

The SSs may conventionally comprise a Primary Synchronisation Signal (PSS), a Secondary Synchronisation Signal (SSS) and a Physical Broadcast Channel (PBCH). The PSS and SSS may carry a Physical Cell Identity (PCI). The acquisition of the PSS and SSS by a UE may provide frame, slot and symbol synchronisation with a cell. PBCH may carry a System Frame Number (SFN). The acquisition of the PBCH may provide SFN synchronisation with a cell.

PSS and SSS may occupy one symbol each. PBCH may occupies two symbols. The symbol time duration may depend on the applied sub-carrier spacing (i.e. on the applied numerology).

PSS, SSS and PBCH may be part of a Synchronisation Signal Block (SSB). PSS and SSS may always be transmitted in an SSB. PBCH may be omitted in an SSB.

The way SSBs are transmitted may be varied dependent on the transmission mode applied by a NR cell. For example in a single beam NR cell, the SSBs may be transmitted with a sector wide beam once every predefined period, named SSB repetition period (SSBRP).

In a multi beam NR cell, SSBs may be transmitted in a burst, named SSB burst (SSBB), with each SSB of the SSBB associated with a different beam. The SSBB (or SSBB set if for example different SSBBs serve different beam combinations) may be repeated every predefined period, named SSBB repetition period (SSBBRP or SSBB set repetition period). Within a SSBB, the SSBs may or may not be sent contiguously in time.

Figure 4:
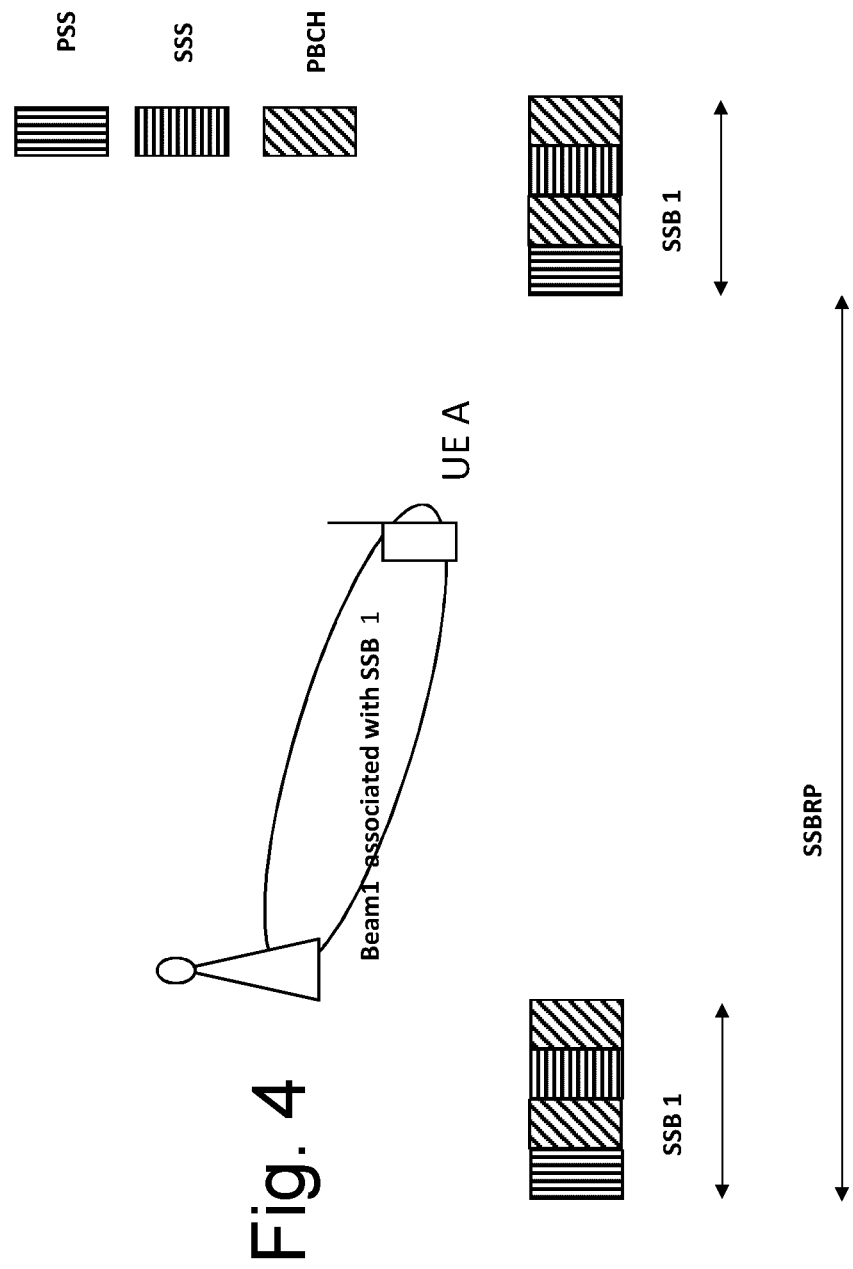
FIG. 4 shows a schematic representation of a base station transmitting synchronisation signal blocks in a single beam cell.

FIG. 4 shows a schematic representation of a gNB providing a single beam NR cell. The single beam NR cell transmits SSB 1 associated with Beam 1. A UE A may use Beam 1 to synchronise with the single beam NR cell.

Figure 5:
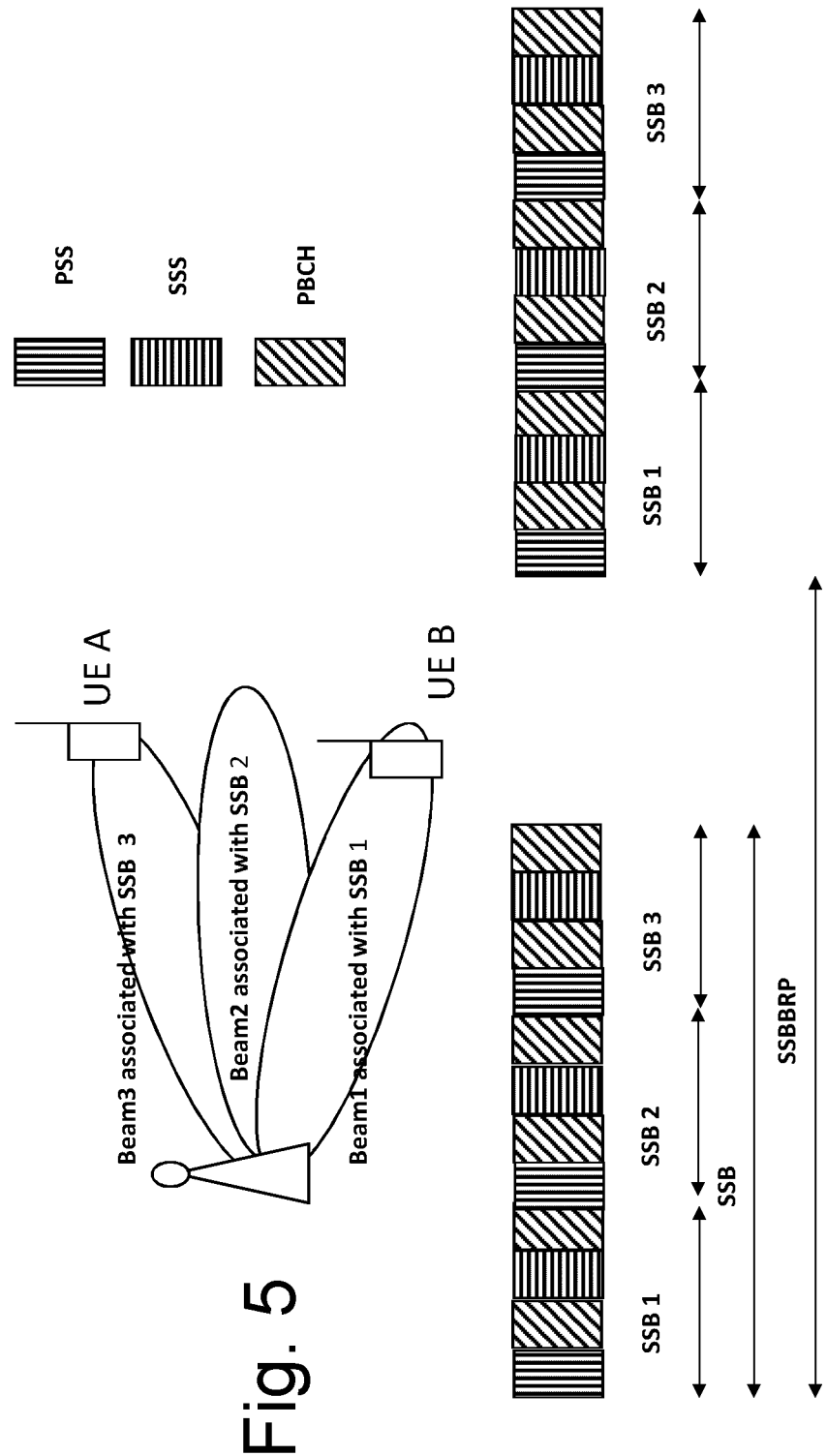
FIG. 5 shows a schematic representation of a base station transmitting synchronisation signal block bursts in a multi beam cell.

FIG. 5 shows a schematic representation of a gNB providing a multi beam NR cell. The multi beam NR cell transmits SSB 1 associated with Beam 1, SSB 2 associated with Beam 2 and SSB 3 associated with Beam 3. A UE A may use Beam 3 to synchronise with the multi beam NR cell. A UE B may use Beam 1 to synchronise with the multi beam NR cell.

A problem may be to determine an appropriate measurement gap (MG) configuration for at least one UE served by a serving LTE cell so that it can measure and report at least one SSB of at least one SSBB transmitted by at least one neighbouring NR cell, when the serving LTE cell and the at least one neighbouring NR cell are not phase synchronised (i.e. not aligned).

Another problem may be to determine an appropriate MG configuration for at least one UE served by a serving LTE cell so that it can measure and report at least one SSB of at least one SSBB transmitted by different neighbouring NR cells when the different neighbouring NR cells are not phase synchronised (i.e. not time aligned when transmitting their respective SSBBs).

An MG is a time interval with a measurement gap length (MGL) which repeats periodically with a measurement gap repetition period (MGRP). During an MG, at least one UE may switch a receiver from a frequency of the serving LTE cell to the frequency of at least one neighbouring NR cell so that it can attempt to detect at least one SSB of at least one SSBB transmitted by at least one neighbouring NR cell.

The time position of a MG within a MGRP may be indicated by a measurement gap offset (MGO). A MG may start every LTE system frame number (LTE SFN) that is equal to MGO when modulo MGRP is applied to it.

The time position of a SSBB within an SSBBRP may be indicated by a SSBB offset (SSBBO). An SSBBRP may starts every NR SFN modulo SSBBRP if SSBBRP is greater than 5 ms, otherwise every NR subframe modulo SSBBO.

A requirement for at least one UE to measure at least one SSB of at least one SSBB transmitted by at least one neighbouring NR cell may be that the at least one SSBB of the at least one neighbouring NR cell, or at least one SSB of the at least one SSBB from the at least one neighbouring NR cell associated with a beam under which the UE camps, falls into the MG. To fulfil this requirement the serving LTE cell may not only know the SSBBRP and the SSBBO of the at least one neighbouring NR cell, but also the reference timing according to which the NR SFN is counted. The latter condition may imply that the serving LTE cell and the at least one neighbouring NR cell are phase synchronised or that the time difference between the serving LTE cell and the at least one neighbouring NR cell is known.

Without phase synchronisation and when the time difference between the serving LTE cell and the at least one neighbouring NR cell is not known, it is likely that at least one UE may not measure the at least one neighbouring NR cell because no SSBB from the at least one neighbouring NR cell may fall within the MG.

Figure 6:
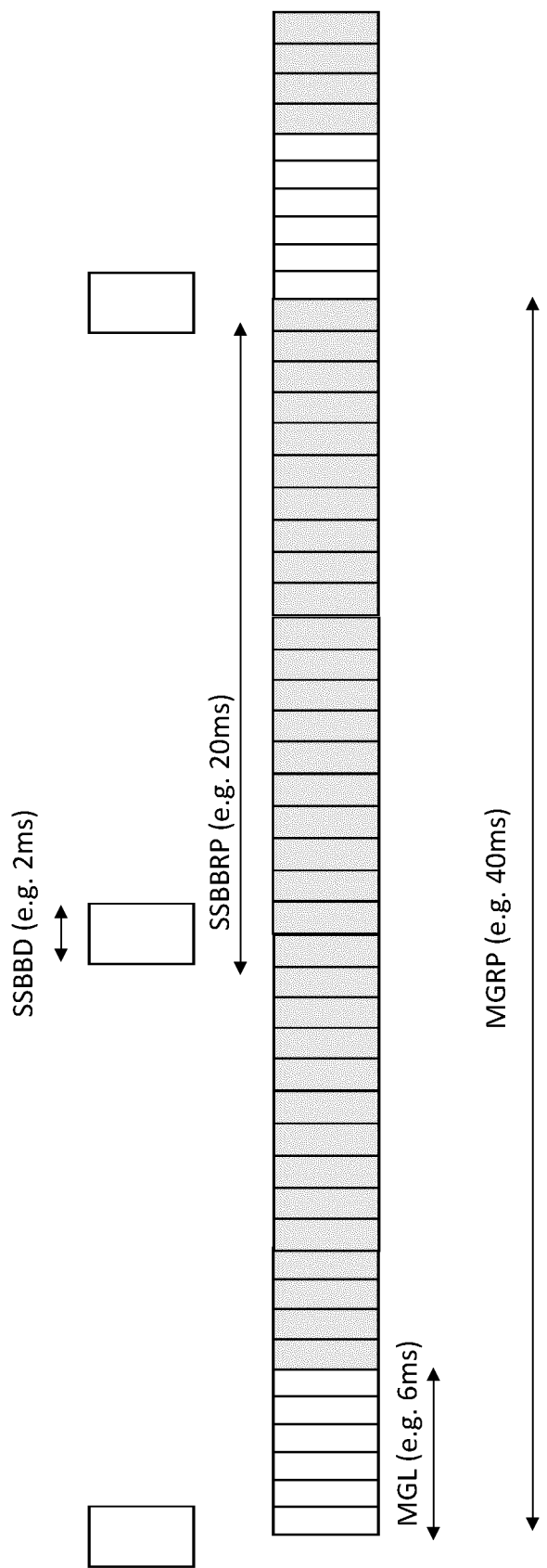
FIG. 6 shows a schematic representation of a measurement gap configuration comprising a measurement gap length of 6 ms and a measurement gap repetition period of 40 ms when a synchronisation signal block burst configuration comprises a synchronisation signal block burst duration of 2 ms and a synchronisation signal block burst repetition period of 20 ms.

FIG. 6 shows a schematic representation of a MG configuration comprising a MGL of 6 ms and a MGRP of 40 ms when a SSBB configuration comprises a SSBB duration (SSBBD) of 2 ms and a SSBBRP of 20 ms. As none of the SSBBs entirely falls into the MG at least one UE may not be able to entirely measure the SSBB. At least one UE may be able to measure part of the SSBB if at least a SSB of the SSBB associated with a beam under which the at least one UE camps falls into the MG.

Similarly, for at least one UE to measure at least one SSB of at least one SSBB transmitted by different neighbouring NR cells, it may not only be required that the serving LTE cell and the different neighbouring NR cells are phase synchronised but also that, for of each of the different neighbouring NR cells, at least one SSB of at least one SSBB from the different neighbouring NR cells associated with a beam under which the UE camps falls into the MG.

A solution to the above problem may be to phase synchronise the serving LTE cell and at least one neighbouring NR cell. In this way, the serving LTE cell may configure the MG configuration with an appropriate MGO with respect to at least one SSBB from at least one neighbouring NR cell. However, while in time division duplex (TDD) systems it may be assumed that the serving LTE cell and at least one neighbouring NR cell may be phase synchronised, this assumption may not generally hold for frequency division duplex (FDD) systems.

Also, imposing such requirement may add operational costs to the operator who may have to install an appropriate phase synchronisation system (e.g. global navigation satellite system (GNSS) or IEEE1588v2 system). If this may not be a major issue for co-located deployments and among nodes from the same vendor, it may be an issue in non-co-located deployments and among nodes from different vendors.

Another solution may be to introduce "new" (with respect to the ones currently defined by 3GPP; see TS 36.133) MG configurations, as for example:

A MG configuration with a MGL equal to or greater than (160+y) ms, where "y" accounts for the SSBBD plus twice the UE receiver switching time and "160" ms covers the largest SSBBRP allowed by 3GPP for an NR cell. This option may however have major service impacts due to the long connection interruption between at least one UE and the serving LTE cell and it may require support from at least one UE, i.e. 3GPP endorsement.

A MG configuration with a "sliding" MGO (e.g. a MGO shifted by a predefined time amount each new MGRP.

One or more embodiments propose to implement a "sliding" MGO by configuring different UEs (e.g. at the same time or at different times) or the same UE (e.g. at different times) with a MG configuration having a different MGO until at least one SSBB of at least one neighbouring NR cell is entirely detected (i.e. until all SSBs of at least one SSBB from at least one neighbouring NR cell are detected).

Alternatively, one or more embodiments propose to implement a "sliding" MGO by configuring different UEs (e.g. at the same time or at different times) or the same UE (e.g. at different times) with a MG configuration having a different MGO until as many SSBs of at least one SSBB from at least one neighbouring NR cell as possible are detected (i.e. until a pre-defined maximum number of SSBs of at least one SSBB from at least one neighbouring NR cell as possible are detected).

The MGOs may be shifted with a predefined amount of time. The MGOs configured consecutively in two UEs may be not contiguous. The MGOs configured consecutively in a UE may be not contiguous.

A two-step approach may be proposed for an eNB providing a serving LTE cell to search for a MG configuration with an appropriate MGO for at least one UE served by the serving LTE cell.

A first step may apply when no successful neighbouring NR cell measurement report has been received by the eNB from any UE (i.e. when no neighbouring NR cell measurement report with any measurement result has been received by the eNB from any UE served by the eNB). This may occur, for example, at the beginning of operation of the eNB, after the eNB restarts, after a predefined amount of time or after configuring different UEs with a predefined number of MG configurations without successful neighbouring NR cell measurement report from any UE.

It will be understood that when reporting a neighbouring NR cell measurement report to the eNB, at least one UE may indicate at least one SSB of at least one SSBB from at least one neighbouring NR cell that the UE detected via a corresponding SSB index (e.g. SSB X).

For example, in FIG. 5 the UE B may report a neighbouring NR cell measurement report indicating SSB 1 associated with beam 1 to the eNB. The UE A may report a neighbouring NR cell measurement report indicating SSB 3 associated with beam 3 to the eNB.

In the first step, the eNB may search for a MGO allowing at least one UE to send a successful neighbouring NR cell measurement report indicating at least one SSB of at least one SSBB from at least one neighbouring NR cell.

The eNB may configure a MGO round robin. The eNB may configure different UEs (e.g. at the same time or at different times) or the same UE (e.g. at different times) with a different MGO taken from a set of all possible MGOs. The MGO round robin may cover the set of "all possible" MGOs until the eNB receives a successful neighbouring NR cell measurement report from at least one UE.

The set of "all possible" MGOs may refer to a set of all MGOs for which at least one SSBB from at least one neighbouring NR cell may appear at a different time position in the respective MGRP.

A second step may be performed after the first step. In this second step the eNB may search for a MGO which allows to capture at least one entire SSBB of the at least one NR cell that has been detected in the first step by configuring a MGO round robin. The eNB may configure different UEs (e.g. at the same time or at different times) or the same UE (e.g. at different times) with a different MGO taken from a sub-set of the set of all possible MGOs.

The subset of the set of "all possible" MGOs may refer to a subset of the set of "all possible" MGOs for which at least one UE is still able to detect the at least one SSB of at least one SSBB from at least one neighbouring NR cell reported in the first step.

In other words, the subset of the set of "all possible" MGOs may refer to a subset of the set of "all possible" MGOs for which the at least one SSB beam of at least one SSBB from at least one neighbouring NR cell reported in the first step still falls into the MG.

It will be understood that when a UE reports a neighbouring NR cell measurement report to the eNB, the UE may indicate at least one SSB of at least one SSBB from at least one neighbouring NR cell different from the at least one SSBB from at least one neighbouring NR cell reported in the first step.

It will also be understood that the at least one UE reporting a successful neighbouring NR cell measurement report in the first step and the at least one UE reporting a successful neighbouring NR cell measurement report in the second step may be the same UE or may be different UEs.

The second step may be repeated each time at least one UE reports at least one SSB of at least one SSBB from at least one neighbouring NR cell different from the SSBs already reported in the first step and in previous occurrences of the second step.

In this way the subset of the set of "all possible" MGOs is narrowed down recursively until the eNB identifies at least one MGO allowing the at least one UE served by the serving LTE cell to send a successful NR neighbouring cell measurement report for all SSBs of at least one SSBB from at least one neighbouring NR cell.

Alternatively, the subset of the set of "all possible" MGOs is narrowed down recursively until the eNB identifies at least one MGO allowing the at least one UE served by the serving LTE cell to send a successful NR neighbouring cell measurement report for as many SSBs of at least one SSBB from at least one neighbouring NR cell as possible.

An example of an implementation of the first step and the second step will be described further below and will facilitate their understanding.

An advantage of this solution is that it may not require phase synchronisation between the serving LTE cell and at least one neighbouring NR cell and it may not require changes to 3GPP/UEs.

As explained above, in the first step the eNB may check a set of "all possible" MGOs until a successful NR measurement report is received from at least one UE (i.e. until a neighbouring NR cell measurement report indicating at least one SSB of at least one SSBB from at least one neighbouring NR cell is received from at least one UE). As the eNB does not know in advance where at least one SSBB from at least one neighbouring NR cell may fall, the set of "all possible" MGO values may be checked.

However, depending on the SSBBD and SSBRP, some MGOs of the set of "all possible" MGOs may be skipped shortening the searching time without losing in detection probability by taking into account the following rule.

To guarantee that at least one UE under coverage of at least one beam of at least one neighbouring NR cell may report a successful neighbouring NR cell measurement report, there may be at least one MG configuration able to capture at least one entire SSBB from at least one neighbouring NR cell.

This rule can be expressed by the following:

(SSBBOD+MGOS)<=MGL  [Equation 1]

SSBBOD may refer to the SSBB overall time duration. SSBOD may be set equal to the SSBBD (e.g. min 1 ms, max 5 ms; see TS 38.331), or may be set to the sum of the SSBD and twice the UE frequency switching time (e.g. max (2*0.5) ms, see TS 36.133), if the eNB is not using the measurement gap timing advance option ('mgta' in TS 38.331).

MGOS may refer to the MGO step. MGOS may indicate the time step or the time shift between two contiguous MGOs.

MGL may refer to the MG length. MGL may indicate the time duration of the MG (e.g. 6 ms; see TS 36.133).

Other parameters may be taken into consideration in SSBBOD, such as the accuracy of the phase synchronisation in at least one neighbouring NR cell and/or the clock drift in at least one neighbouring NR cell and in the serving LTE cell where the UE is requested the SSBB measurements.

From Equation 1 it comes that the shorter the SSBBOD, the longer the applicable MGOS may be and therefore the faster the first step may be performed. On the other hand, a short SSBBOD (for the same neighbouring NR cell numerology) may mean a short SSBBD, i.e. a low number of SSBs within the SSBB transmitted by at least one neighbouring NR cell and therefore a low number of beams and a reduced cell radio coverage.

A way to speed up the execution of the first step without shortening the SSBBD may be to introduce at least one SSB associated with an omnidirectional beam in at least one SSBB transmitted by at least one neighbouring NR cell.

Figure 7:
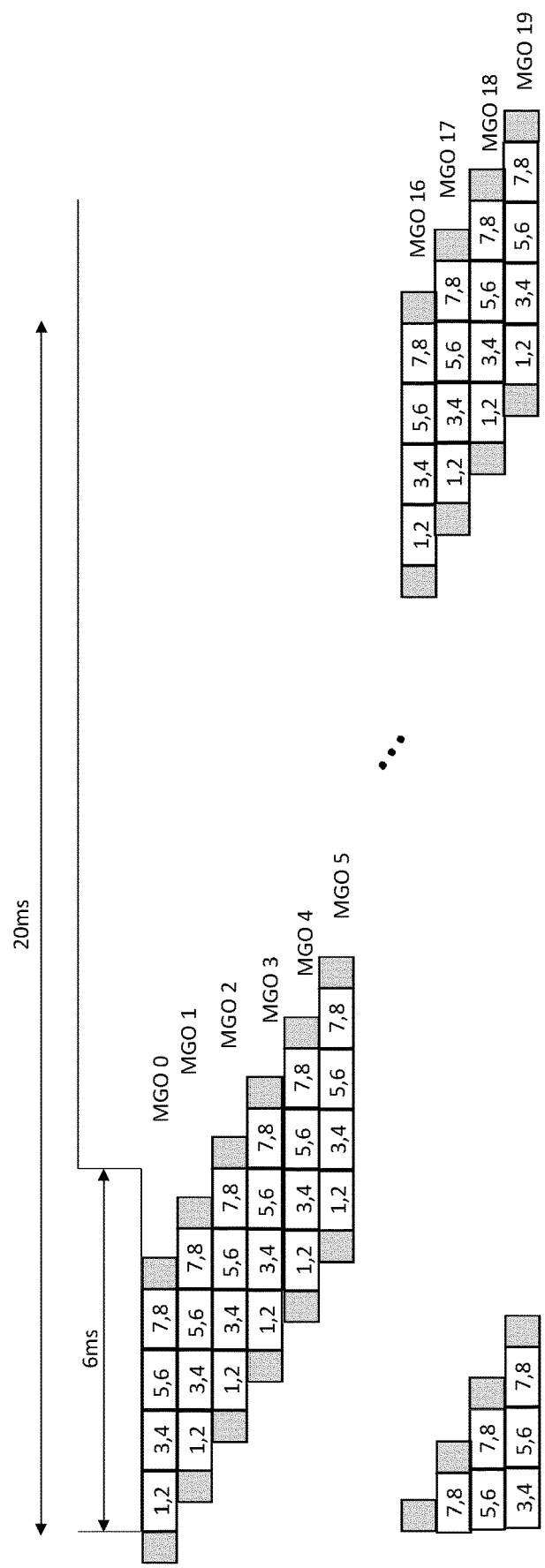
FIG. 7 shows a schematic representation of a measurement gap configuration comprising a measurement gap length of 6 ms and a measurement gap repetition period of 40 ms when a synchronisation signal block burst configuration comprises a synchronisation signal block burst duration of 5 ms and a synchronisation signal block burst repetition period of 20 ms and subcarrier spacing is 15 KHz.

For example with reference to FIG. 7 showing the case of SSBBOD=5 ms, SSBBRP=20 ms, MGRP=40 ms and MGL=6 ms, the MGOS may be 1 ms (i.e. 5 ms+MGOS s 6 ms). A MGOS of 1 ms may lead to a set of "all possible" MGOs comprising twenty MGOs and to a maximum of 20 ms before at least one UE under the coverage of at least one neighbouring NR cell may send a successful NR measurement report to a serving LTE cell. However, if at least one neighboring NR cell would transmit one of the eight SSBs with omnidirectional (or sectorial) radio coverage, the "effective" SSBBOD would be reduced to 2 ms (1 ms for the omnidirectional (or sectorial) SSB and 1 ms to cover the UE frequency switching time). With this trick, the applied MGOS could be increased to 4 ms and the maximum time before at least one UE under the coverage of at least one neighbouring NR cell may send a successful NR measurement report to a serving LTE cell would be reduced to 5 ms.

As discussed above the second step may be performed after the first step, that is after at least one UE reported at least one SSB (e.g. SSB "x") of at least one SSBB from at least one neighbouring NR cell when configured with a given MGO value (named here "MGOm").

Considering that per 3GPP (see TS 36.331) MGOs may be signalled to a UE only in steps of "1" ms (named here MGOS) and that with a configured "MGOm" the SSB "x" may be time positioned anywhere in the respective MG (e.g. in the first time slot or in the last time slot), an eNB may derive a subset of the set of "all possible" MGOs able to capture the SSB "x". The subset of the set of "all possible" MGOs able to capture the SSB "x" comprises the following (Nback+Nforw+1) MGO values ("MGOi") obtained by shifting backward and forward "MGOm" as follows:

MGOi=MGOm+i*MGOS  [Equation 2]

"i" may be an integer ranging from −"Nback" to +"Nforw".

Nback may be an integer determined as follows:

Nback=QUOTIENT(detectedLowIndexSSB, SSBDPM)+CEIL[MOD(detectedLowIndexSSB, SSBDPM)/SSBDPM]  [Equation 2a]

Nforw may be an integer determined as follows:

Nforw=CEIL(SSBBOD)−1−QUOTIENT(detectedHighIndexSSB,SSBDPM)+CEIL[MOD(detectedHighIndexSSB+1,SSBDPM)/SSBDPM]  [Equation 2.b]

SSBDPM may indicate the number of SSBs which are broadcasted during a 1 ms period. This number may be 2 with a 15 kHz sub-carrier spacing (SCS), 4 with a 30 kHz SCS, 16 with a 120 kHz SCS, and 32 with a 240 kHz SCS, see TS 38.213 section 4.1.

detectedLowIndexSSB may be the lowest index of the SSBs detected so far by any UE with "MGOm". In this example, the index of SSB "x".

detectedHighIndexSSB may be the highset index of the SSBs detected so far by any UE "MGOm". In this example, the index of SSB x.

SSBBOD is the SSBB overall duration of the SSBB of the NR cells to measure as defined in equation 1.

All parameters in equation 2a and 2b may be expressed in unit of ms.

An eNB may configure a round robin. The eNB may configure a different MGO value among the subset (Nback+Nforw+1) of the set of "all possible" MGOs to different UEs (e.g. at the same time or at different times) or to the same UE (e.g. at different times) until at least one other SSB "y" is reported.

Each time at least one UE reports a new SSB "y" for a configured MGO (e.g. "MGOn"), the eNB may repeat the second step restricting further the subset of the set of "all possible" MGOs able to capture both SSB "x" and SSB "y" until all transmitted SSBs are finally reported or no new SSBs are reported (for the case where some beams of at least one neighbouring NR cell are never seen by at least one UE under coverage of a serving LTE cell—for example an NR cell overlapping two LTE cells).

For example, with reference to FIG. 7, let's assume that in the first step at least one UE reports a measurement report indicating SSB 6 with MGO 2. The eNB may determine that Nback is equal to three (i.e. 3=QUOTIENT(6, 2)+CEIL[MOD(6, 2)/2]=3+0), and Nforw is equal to 1 (i.e. 1=CEIL(4)−1−QUOTIENT(6, 2)+CEIL[MOD(6+1, 2)/2]=0+1). The subset of the set of "all possible" MGOs able to capture SSB 6 may comprise: MGO 19, MGO 0, MGO 1, MGO 2, and MGO 3 (i.e. MGO 2, the Nback preceding MGOs and the Nforw following MGOs).

In an occurrence of the second step the eNB may configure a round robin with this subset of the set of "all possible" MGOs with different UEs (e.g. at the same time or at different times) or with the same UE (e.g. at different time)

until it receives a measurement report for at least one new SSB. Let's assume that in this occurrence second step a UE reports a measurement report indicating SSB 2 with MGO 0.

As with MGO 0 both SSB 2 and SSB 6 are captured by at least one UE, it may imply that MGO 0 allows at least one UE to also capture SSBs in between (i.e. SSB2, SSB3, SSB 4, SSB 5 and SSB 6). The eNB may determine that Nback is equal to one (i.e. with reference to FIG. 7: 1=QUOTIENT (2, 2)+CEIL[MOD(2, 2)/2]=1+0) and Nforw is equal to one (the highest reported SSB index has not changed and therefore Nforw is not modified). The subset of the set of "all possible" MGOs able to capture SSB2, SSB3, SSB 4, SSB 5 and SSB 6 may comprise: MGO19, MGO 0, and MGO 1 (i.e. MGO 0, the Nback preceding MGOs and the Nforw following MGOs).

In another occurrence of the second step the eNB may configure a round robin with this subset of the set of "all possible" MGOs with different UEs (e.g. at the same time or at different times) or with the same UE (e.g. at different time) until it receives a measurement report for at least one new SSB. Let's assume that in this other occurrence of the second step at least one UE reports a measurement report indicating SSB 7 with MGO 0.

As with MGO 0 SSB 2, SSB 6 and SSB 7 are captured by at least one UE, it may imply that MGO 0 allows at least one UE to also capture SSBs in between (i.e. SSB2, SSB3, SSB 4, SSB 5, SSB6, and SSB 7). The eNB may determine that Nback remains equal to one (-since the lowest reported SSB index has not changed) and Nforw is equal to zero (0=CEIL (4)−1−QUOTIENT(7, 2)+CEIL[MOD(7+1, 2)/2]=0+0). The subset of the set of "all possible" MGOs able to capture SSB2, SSB3, SSB 4, SSB 5, SSB 6, and SSB 7 may comprise the following MGOs: MGO 19 and MGO 0 (i.e. MGO 0, the Nback preceding MGOs and the Nforw following MGOs).

In another occurrence of the second step the eNB may configure a round robin with this subset of the set of "all possible" MGOs with different UEs (e.g. at different times or at a same time) or with the same UE (e.g. at different time) until it receives a measurement report for at least one new SSB. Let's assume that in this other occurrence of the second step at least one UE reports a measurement report indicating SSB 0 with MGO 19.

The eNB determines that MGO 19 allows the UEs served by the serving cell to capture SSB 0, SSB 1, SSB2, SSB3, SSB 4, SSB 5, SSB 6, and SSB 7 and therefore the whole SSBB. The eNB may adjust the MG configuration of at least one UE and may provide the MG configuration to the at least one UE. The at least one UE may use the provided MG configuration when requested to measure neighbouring NR cells.

When different neighbouring NR cells apply different SSBB patterns and/or different numerologies, an eNB may select neighbouring NR cells having SSBB patterns overlapping in time and with the same periodicity and a same numerology from which to derive the MGO value(s) to configure to a UE when requested to measure at least that one NR neighboring. Theses neighbouring NR cells may be referred to as a "reference neighbouring NR cells" as opposed to "non-reference neighbouring NR cells" having a SSBB pattern not overlapping in time with the SSBB pattern of a reference neighbouring NR cell or with a different periodicity and/or with a different numerology.

An SSBB pattern may be defined by a SSBBD, a SSBBRP, a number of SSBs and/or SSB offsets (SSBOs)/time positions within the SSBB.

Possibly, an eNB may derive and maintain different phase synchronisations using different reference neighbouring NR cells.

When it comes to the MG configuration to provide to at least one UE served by the eNB when requested to measure non-reference neighbouring NR cells, an eNB may select one of the following options.

In a first option, the eNB may select reference neighbouring NR cells and may configure at least one UE with a MG configuration comprising at least one MGO that allows the at least one UE to capture at least one SSBB from the reference neighbouring NR cells.

With this option, it may be possible that the at least one UE still detects at least one SSB from at least one non-reference neighbouring NR cell overlapping in time with at least one SSBB from the reference neighbouring NR cells.

With this option, it may be possible that the at least one UE fails to detect at least one SSB from at least one non-reference neighbouring NR cell not overlapping (i.e. not time aligned) with at least one SSBB from the reference neighbouring NR cells.

In a second option, the eNB may configure at least one UE with a MG configuration comprising at least one MGO that allows the at least one UE to capture as many SSBs of at least one SSBB from at least one reference neighbouring NR cell as possible and as many SSBs of at least one SSBB from at least one non-reference neighbouring NR cells as possible.

With this option, at least one UE may fail to detect at least one SSB from at least one reference NR cell, depending on the configured MGO and on the beam under which a UE camps (e.g. if the MGO does not allow the at least one UE to capture the SSB of at least one SSBB from at least one reference neighbouring NR cell associated with the beam under which the UE camps).

With this option, at least one UE may fail to detect at least one SSB from at least one non-reference NR cell, depending on the configured MGO and on the beam under which a UE camps (e.g. if the MGO does not allow the at least one UE to capture the SSB of at least one SSBB from at least one non-reference neighbouring NR cell associated with the beam under which the UE camps).

In a third option (somewhere similar to the first option) the eNB may configure at least one UE with a MG configuration comprising at least one MGO that allows the at least one UE to capture at least one SSB from at least one reference neighbouring NR cell with the additional condition that at least one non-reference NR cell transmits at least one omnidirectional (or sectorial) beam associated with a SSB overlapping in time with at least one SSBB from the at least one reference NR cell.

The at least one MGO may allow the at least one UE to capture at least one SSB from at least one reference neighbouring NR cell, at least one SSB from at least one non-reference neighbouring NR cell time aligned with at least one SSBB from at least one reference neighbouring NR cell and at least one SSB of at least one SSBB from at least one non-reference neighbouring NR cell associated with the omnidirectional (or sectorial beam). With this option, at least one UE may report any neighbouring NR cell under which it camps.

It may be noted that the problem to capture with one MG configuration SSBB patterns from different neighbouring NR cells may exist independent from whether the different neighbouring NR cells are time synchronised as far as the different neighboring cells apply different SSBB patterns and/or different numerologies. The options proposed above can address this problem.

FIG. 7 shows a schematic representation of a MG configuration comprising a MGL of 6 ms and a MGRP of 40 ms when a SSBB configuration comprises a SSBBD of 5 ms and a SSBBRP of 20 ms and SCS is 15 KHz.

In FIG. 7, a whole SSBB may be captured by shifting the MGO with a MGOS of 1 ms. Any UE configured with an MGO that allows the whole SSBB to be captured may make a successful NR cell measurement report, whatever the beam under which the UE camps (i.e. 1 UE every 20 UEs). All possible MGOs include 20 MGOs.

In FIG. 7, if one of the eight beams were omnidirectional (or sectorial), the first step discussed above could target to only capture the omnidirectional (or sectorial) beam as if the "effective SSBOD" was reduced to 2 ms (i.e. 1 ms for the SSB associated with the omnidirectional beam and 1 ms to cover the UE frequency switching time). With this trick, the applied MGOS may be increased from 1 ms to 4 ms and the number of MGOs to check may be reduced from 20 to only 5.

Figure 8:
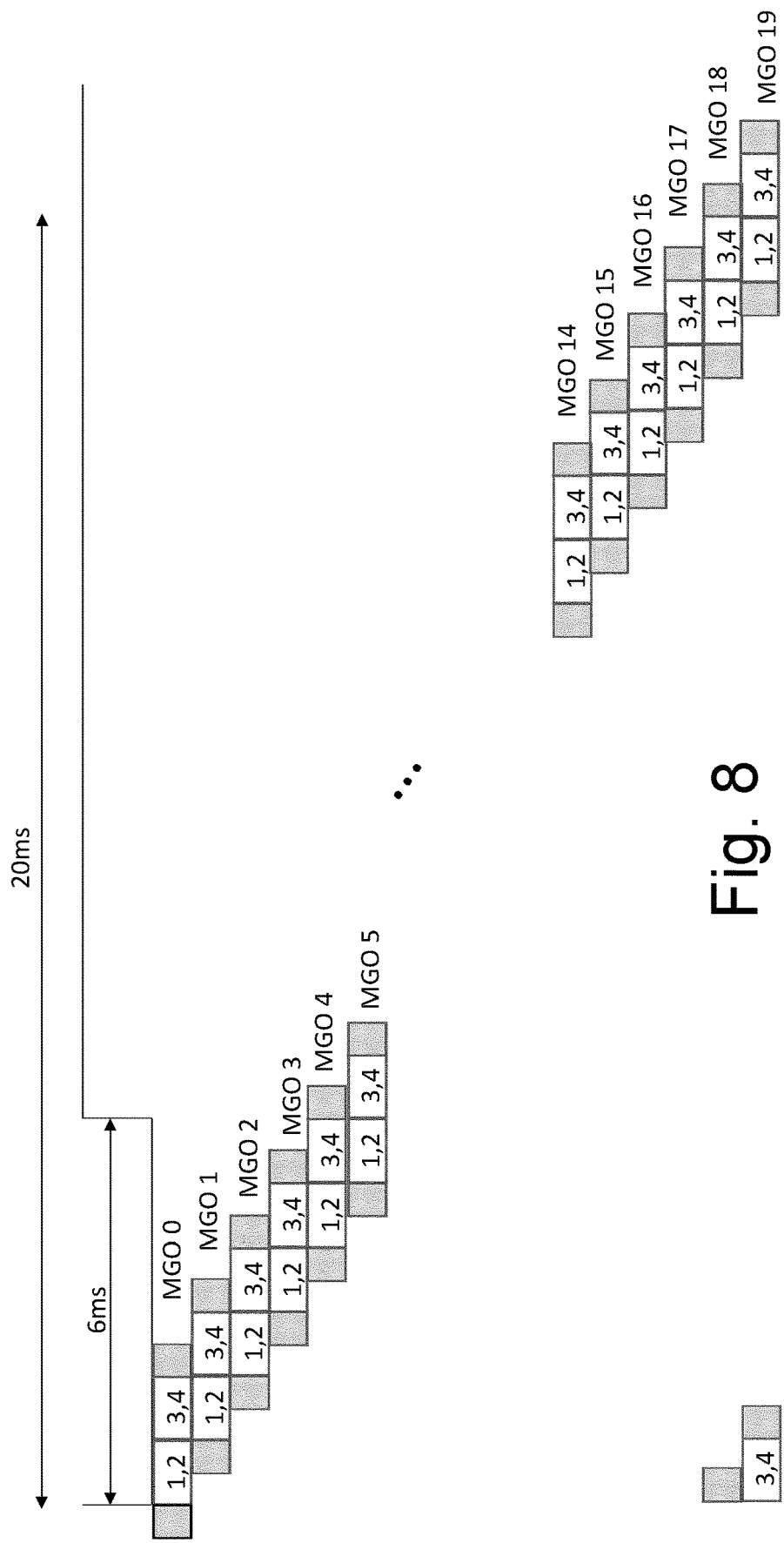
FIG. 8 shows a schematic representation of a measurement gap configuration comprising a measurement gap length of 6 ms and a measurement gap repetition period of 40 ms when a synchronisation signal block burst configuration comprises a synchronisation signal block burst duration of 3 ms and a synchronisation signal block burst repetition period of 20 ms and subcarrier spacing is 15 KHz.

FIG. 8 shows a schematic representation of a MG configuration comprising a MGL of 6 ms and a MGRP of 40 ms when a SSBB configuration comprises a SSBBD of 3 ms and a SSBRP period of 20 ms and SCS is 15 KHz.

In FIG. 8 a whole SSBB may can be captured by shifting the MGO in MGOS of maximum 3 ms. With a 3 ms MGOS step, the whole SSB burst may be captured once. With a 1 ms MGOS, the whole SSB burst may be captured three times. Again, any UE configured with an MGO that allows the whole SSBB to be captured may make a successful NR cell measurement report, whatever the beam under which it camps (three UEs every 20 with 1 ms step or one every 20 with 3 ms step). All possible MGOs include 20 MGOs.

Figure 9:
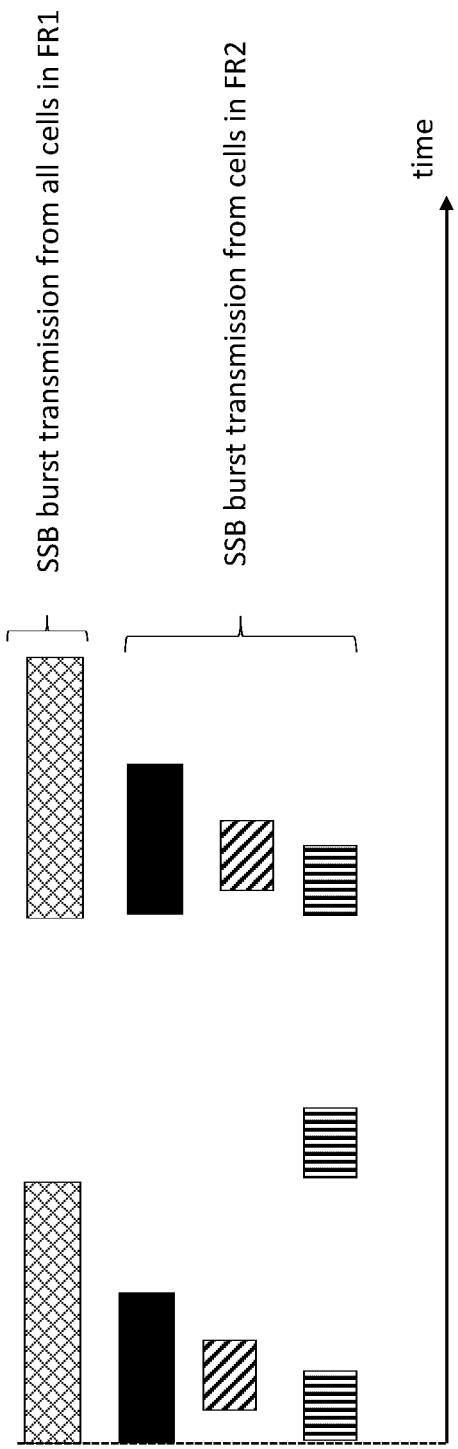
FIG. 9 shows a schematic representation of synchronisation signal block burst transmissions from cells operating in frequency range FR1 and synchronisation signal block burst transmissions from cells operating in frequency range FR2.

FIG. 9 shows a schematic representation of SSBB transmissions from reference neighbouring NR cells operating in frequency range FR1 and SSBB transmissions from non-reference neighbouring NR cells operating in frequency range FR2.

Reference neighbouring NR cells in FR1 have a same numerology (e.g. low SCS) and same SSBB pattern. Non-reference neighbouring NR cells in FR2 have a different numerology and/or a different SSBB pattern.

The SSBBRP and SSBBD of the non-reference neighbouring NR cells in FR2 are not greater than the SSBBRP and SSBBD of the reference neighbouring NR cells in FR1. The SSBBs of the non-reference neighbouring NR cells in FR2 are overlapping in time with the SSBB of the reference NR cells.

An eNB may use the reference neighbouring NR cells in FR1 to acquire an MG configuration comprising one or more MGOs for a UE. In this scenario, the acquired MGOs may allow to capture the reference neighbouring NR cells in FR1 and the non-reference neighbouring NR cells in FR2.

Figure 10:
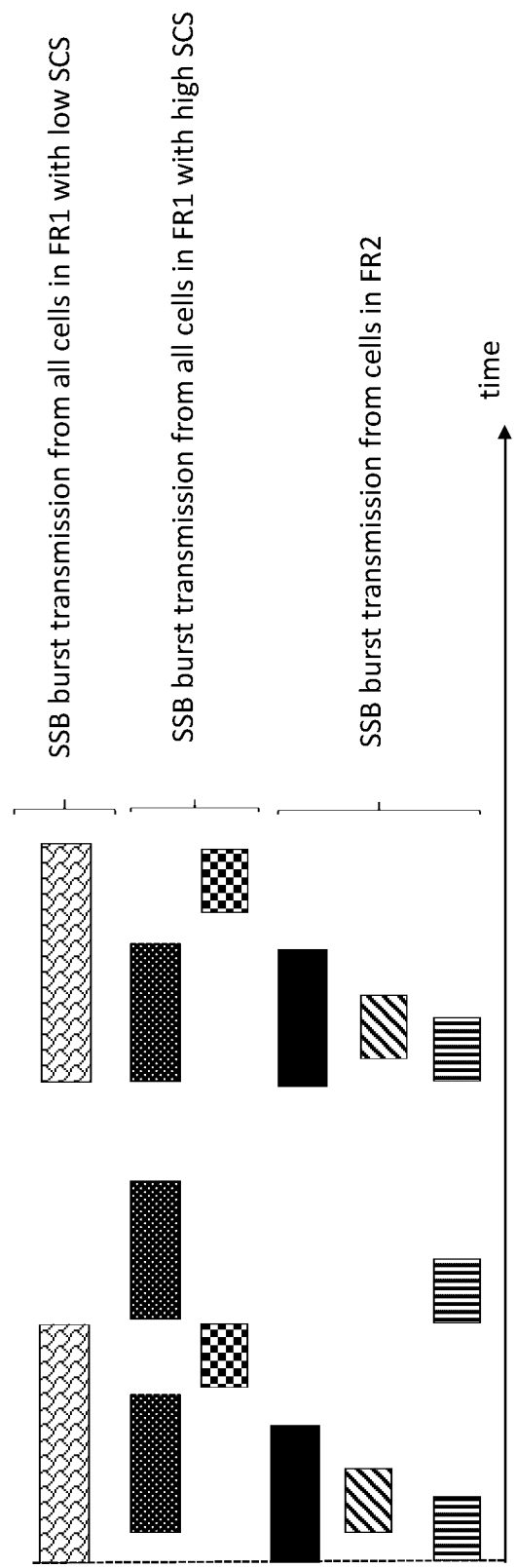
FIG. 10 shows a schematic representation of synchronisation signal block burst transmissions from cells operating in frequency range FR1 with a low subcarrier spacing, synchronisation signal block burst transmissions from cells operating in frequency range FR1 with a high subcarrier spacing and synchronisation signal block burst transmissions from cells operating in frequency range FR2.

FIG. 10 shows a schematic representation of SSBB transmissions from reference neighbouring NR cells operating in frequency range FR1 with a low SCS, SSBB transmissions from non-reference neighbouring NR cells operating in frequency range FR1 with a high SCS and SSBB transmissions from non-reference neighbouring NR cells operating in frequency range FR2.

Reference neighbouring NR cells in FR1 may have a same numerology (e.g. low SCS) and a same SSBB pattern. Non-reference NR cells in FR1 may have a different numerology and/or a different SSBB pattern. Non-reference neighbouring NR cells in FR2 may have a different numerology and/or a different SSBB pattern.

The SSBBRP and SSBBD of the non-reference neighbouring NR cells in FR1 and FR2 are not greater than the SSBBRP and SSBBD of the reference NR neighbouring cells in FR1. The SSBBs of the non-reference neighbouring NR cells in FR1 and FR2 are overlapping in time with the SSBB of the reference neighbouring NR cells in FR1.

An eNB may use the reference neighbouring NR cells in FR1 to acquire an MG configuration comprising one or more MGOs for a UE. In this scenario, the acquired MGOs may allow to capture the reference neighbouring NR cells in FR1 and the non-reference neighbouring NR cells in FR1 and FR2.

Figure 11:
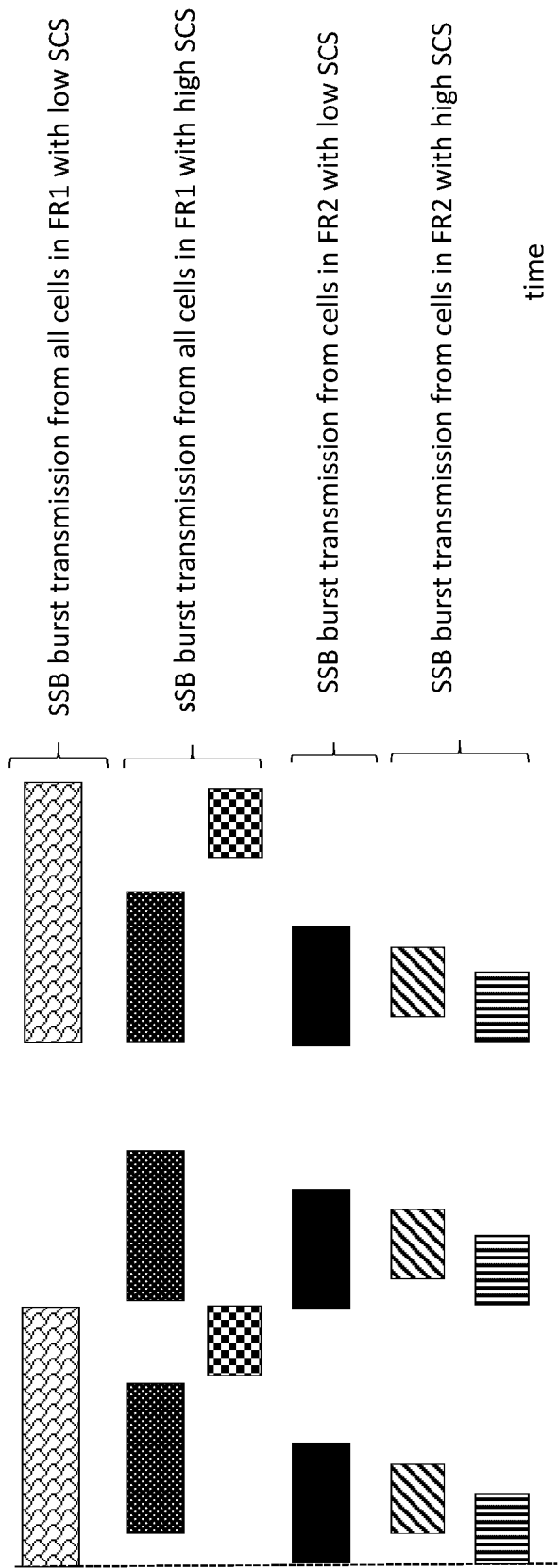
FIG. 11 shows a schematic representation of synchronisation signal block burst transmissions from cells operating in frequency range FR1 with a low subcarrier spacing, synchronisation signal block burst transmissions from cells operating in frequency range FR1 with a high subcarrier spacing, synchronisation signal block burst transmissions from cells operating in frequency range FR2 with a low subcarrier spacing and synchronisation signal block burst transmissions from cells operating in frequency range FR2 with a high subcarrier spacing.

FIG. 11 shows a schematic representation of SSBB transmissions from reference neighbouring NR cells operating in a frequency range FR1 with a low SCS, SSBB transmissions from non-reference neighbouring NR cells operating in the frequency range FR1 with a high SCS, SSBB transmissions from reference neighbouring NR cells operating in a frequency range FR2 with a low SCS, SSBB transmissions from non-reference neighbouring NR cells operating in frequency range FR2 with a high SCS.

Reference neighbouring NR cells in FR1 may have a same numerology (e.g. low SCS) and a same SSBB pattern. Non-reference NR cells in FR1 may have a different numerology and/or a different SSBB pattern.

The SSBBRP and SSBBD of the non-reference neighbouring NR cells in FR1 are not greater than the SSBBRP and SSBBD of the reference neighbouring NR cells in FR1. The SSBBs of the non-reference neighbouring NR cells in FR1 are overlapping in time with the SSBB of the reference neighbouring NR cells in FR1.

Reference neighbouring NR cells in FR2 may have a same numerology (e.g. low SCS) and a same SSBB pattern. Non-reference neighbouring NR cells in FR2 may have a different numerology and/or a different SSBB pattern.

The SSBBRP and SSBBD of the non-reference neighbouring NR cells in FR2 are not greater than the SSBBRP and SSBBD of the reference neighbouring NR cells in FR2. The SSBBs of the non-reference neighbouring NR cells in FR1 are overlapping in time with the SSBBs of the reference neighbouring NR cells in FR.

An eNB may use the reference neighbouring NR cells in FR1 to acquire an MG configuration comprising one or more first MGOs for a UE. An eNB may use the reference neighbouring NR cells in FR2 to acquire a second MG configuration comprising one or more second MGOs for a UE.

In this scenario, the MGOs acquired from the reference neighbouring cells in FR1 allow to capture also the other cells in FR1, whereas the MGOs acquired from the reference neighbouring cells in FR2 allow to capture the other cells in FR2.

When a UE measures on FR1 and FR2 a compromise may be found (e.g. give preference to FR2).

Figure 12:
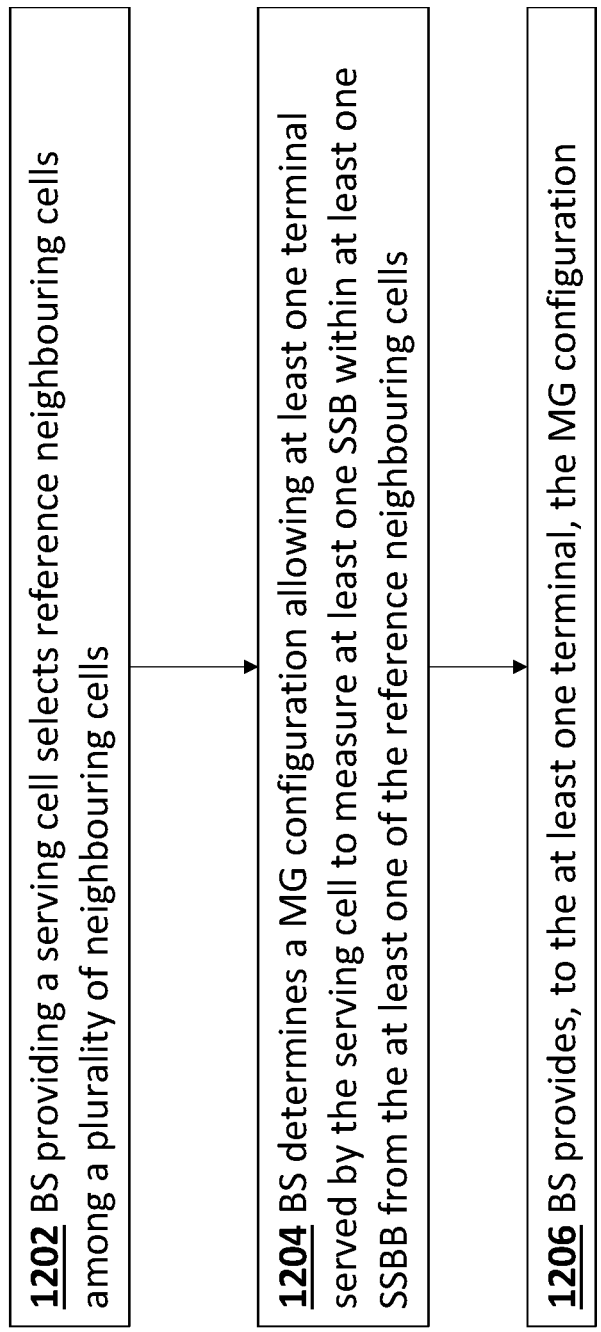
FIG. 12 shows a diagram of a method performed by a base station providing a serving cell for determining and providing a measurement gap configuration allowing at least one terminal served by the serving cell to measure at least one synchronisation signal block burst from at least one reference neighbouring cell.

FIG. 12 shows a diagram of a method performed by a BS (e.g. eNB) providing a serving cell (e.g. serving LTE cell) for acquiring and providing a MG configuration allowing at least one terminal (e.g. UE) served by the serving cell to measure at least one SSB within at least one SSBB from at least one reference neighbouring cell (e.g. reference neighbouring NR cell).

In step 1202, the BS may select reference neighbouring cells among a plurality of neighbouring cells of the serving cell.

The plurality of neighbouring cells may comprise the reference neighbouring cells with a same numerology and SSBB patterns overlapping in time and with a same periodicity. The reference neighbouring cells may have the same SSBB patterns or different SSBB patterns.

The plurality of neighbouring cells may comprise at least one non-reference neighbouring cell with a different numerology than the reference neighbouring cells and/or with a SSBB pattern not overlapping in time with the SSBB patterns of the reference neighbouring cells and/or with a different periodicity than the SSBB patterns of the reference neighbouring cells.

A SSBB pattern may comprise a number of SSBs and a SSBBRP. The numerology may comprises a SCS.

The at least one reference neighbouring cell may be configured to transmit at least one SSB associated with an omnidirectional (or sectorial) beam within at least one SSBB.

In step 1204 the BS may determine a MG configuration allowing at least one terminal served by the serving cell to measure at least one SSB within at least one SSBB from at least one of the reference neighbouring cells.

In step 1206, the BS may provide, to the at least one terminal, the MG configuration.

In an implementation of step 1204, the BS may determine at least one MGO allowing the at least one terminal served by the serving cell to measure as many SSBs as possible within at least one SSBB from at least one of the reference neighbouring cells.

In a first step, the BS may determine a first set of MGOs based on a set of all possible MGOs to measure a SSBB from the at least one reference neighbouring cell. The first set of MGOs may comprise the set of all possible MGOs to measure at least one SSB within at least one SSBB from at least one of the reference neighbouring cell.

Alternatively, the first set of MGOs may comprise part of the set of all possible MGOs to measure at least one SSB within at least one SSBB from at least one of the reference neighbouring cells. The BS may determine the first set of MGOs based on a SSBBRP and a MGOS. The BS may determine the MGOS based on a SSBBOD and a MGL. The BS may determine the MGOS so that the SSBBOD plus the MGOS is lower than or equal to the MGL (as per equation 1).

The BS may provide, to one of the at least one terminal served by the serving cell, the first set of MGOs.

The BS may receive, from the one of the at least one terminal served by the serving cell, an indication of at least a first MGO among the first set of MGOs allowing the one of the at least one terminal served by the serving cell to measure at least one first SSB within at least one SSBB from at least one of the reference neighbouring cells.

In a second step, the BS may determine a second set of MGOs based on the first set of MGOs and including at least one first MGO. The BS may provide, to one of the at least one terminal served by the serving cell, the second set of MGOs. The BS may receive, from the one of the at least one terminal served by the serving cell, an indication of at least one second MGO among the second set of MGOs allowing at least one terminal served by the serving cell to measure at least one second SSB within at least one SSBB from at least one of the reference neighbouring cells.

The second set of MGOs may comprise the at least one first MGO and at least one other MGO in the first set of MGOs.

The BS may adjust the MG configuration to comprise the at least one MGO allowing the at least one terminal served by the serving cell to measure as many SSBs as possible within at least one SSBB from at least one of the reference neighbouring cells.

In another implementation of step 1240, the BS may determine at least one MGO allowing the at least one terminal served by the serving cell to measure as many SSBs as possible within at least one SSBB from at least one of the reference neighbouring cells and as many SSBs as possible within at least one SSBB from at least one non-reference neighbouring cell overlapping in time with at least one SSBB from at least one of the reference neighbouring cells.

The BS may adjust the MG configuration to comprise the least one MGO allowing the at least one terminal served by the serving cell to measure as many SSBs as possible within at least one SSBB from at least one of the reference neighbouring cells and as many SSBs as possible within at least one SSBB from at least one non-reference neighbouring cell overlapping in time with the at least one SSBB from at least one of the reference neighbouring cells.

In another implementation of step 1204, the BS may determine at least one MGO allowing the at least one terminal served by the serving cell to measure as many SSBs as possible within at least one SSBB from at least one of the reference neighbouring cells and as many SSSBs as possible within at least one SSBB from at least one non-reference neighbouring cell.

The BS may adjust the MG configuration to comprise the least one MGO allowing the at least one terminal served by the serving cell to measure as many SSBs as possible within at least one SSBB from at least one of the reference neighbouring cell and as many system SSBs as possible within at least one SSBB from at least one non-reference neighbouring cell.

In another implementation of step 1204, at least one non-reference neighbouring cell is configured to transmit at least one SSB associated with an omnidirectional (or sectorial) beam within at least one SSBB from the at least one non-reference neighbouring cell. The at least one SSB associated with the omnidirectional (or sectorial) beam may overlap in time with at least one SSBB from at least one of the reference neighbouring cells.

The BS may determine at least one MGO allowing the at least one terminal served by the serving cell to measure as many SSBs as possible within at least one SSBB from at least one of the reference neighbouring cells and the at least one SSB associated with the omnidirectional (or sectorial beam) within at least one SSBB from the at least one non-reference neighbouring cell.

Figure 13:
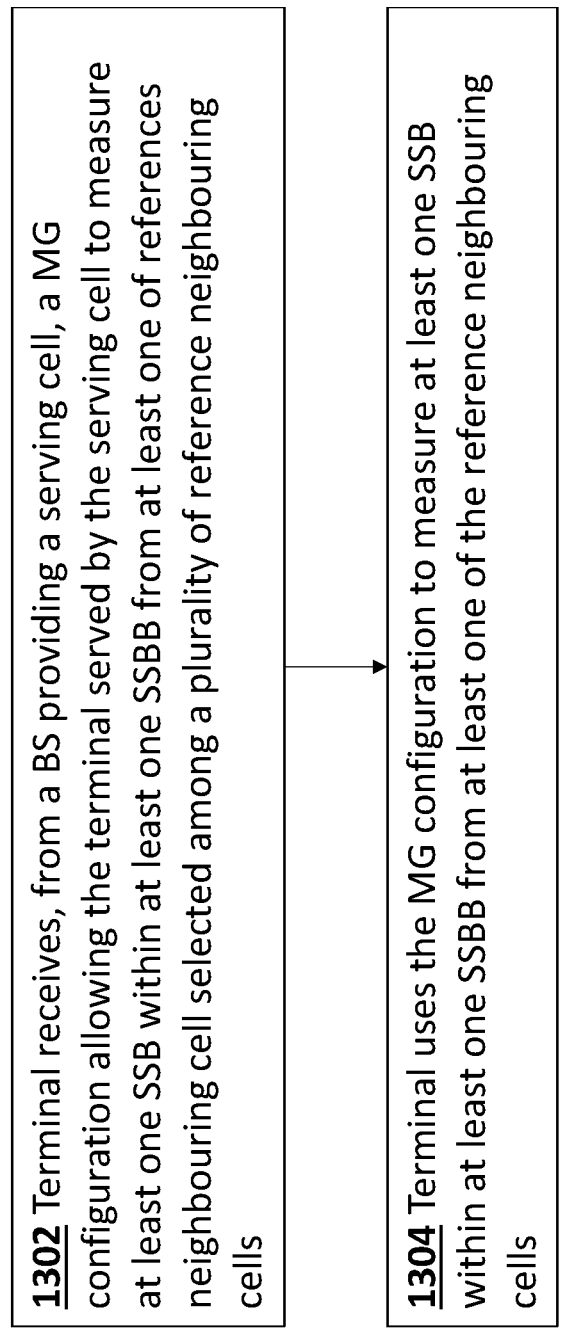
FIG. 13 shows a diagram of a method performed by a terminal served by a serving cell for receiving and using a measurement gap configuration allowing the terminal to measure at least one synchronisation signal block burst from at least one reference neighbouring cell.

FIG. 13 shows a diagram of a method performed by a terminal (e.g. UE) served by a serving cell (e.g. serving LTE cell) for receiving and using a MG configuration allowing the terminal to measure at least one SSB within at least one SSBB from at least one reference neighbouring cell (e.g. reference neighbouring NR cell).

In step 1302, the terminal may receive, from a base station (e.g. eNB) providing a serving cell, a MG configuration allowing the at least one terminal served by the serving cell to measure at least one SSB within at least one SSBB from at least one of reference neighbouring cells selected among a plurality of neighbouring cells.

In step 1304, the terminal may use the MG configuration to measure at least one SSB within at least one SSBB from at least one of the reference neighbouring cells.

In an implementation of step 1302, the terminal may receive, from the BS, a first set of MGOs determined based on a set of all possible MGOs to measure at least one SSB within at least one SSBB from at least one of the reference neighbouring cells.

The terminal may provide, to the BS, an indication of at least one first MGO among the first set of MGOs allowing the terminal to measure at least one first SSB within at least one SSBB from at least one of the reference neighbouring cells.

The terminal may receive, from the BS, a second set of MGOs determined based on the first set of MGOs and the at least one first MGO.

The terminal may provide, to the BS, an indication of at least one second MGO among the second set of MGOs allowing the terminal to measure at least one second SSB within at least one SSBB from at least one of the reference neighbouring cell.

FIG. 14 shows a schematic representation of non-volatile memory media 1400a (e.g. computer disc (CD) or digital versatile disc (DVD)) and 1400b (e.g. universal serial bus (USB) memory stick) storing instructions and/or parameters 1402 which when executed by a processor allow the processor to perform one or more of the steps of the methods of FIGS. 12 and 13.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 12 and 13, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory including computer program code;
the at least one memory storing instructions that when executed by the at least one processor, cause the apparatus at least to:
select reference neighbouring cells among a plurality of neighbouring cells of a serving cell, wherein the reference neighboring cells have a same cell numerology and synchronization signal block burst patterns overlapping in time and with a same periodicity;
determine a measurement gap configuration allowing at least one terminal served by the serving cell to measure at least one synchronisation signal block from at least one of the reference neighbouring cells; and
provide, to the at least one terminal, the measurement gap configuration.

2. The apparatus of claim 1, wherein the plurality of neighbouring cells comprises at least one non-reference neighbouring cell with a different cell numerology than the reference neighboring cells and/or with a synchronisation signal block pattern not overlapping in time with the synchronisation signal block patterns of the reference neighboring cells and/or with a different periodicity than the synchronisation signal block patterns of the reference neighboring cells.

3. The apparatus of claim 2, wherein a synchronisation signal block pattern comprises a number of synchronisation signal blocks and a synchronisation signal block burst repetition period; and
wherein a cell numerology comprises a subcarrier spacing.

4. The apparatus of claim 1, wherein determining the measurement gap configuration allowing the at least one terminal served by the serving cell to measure at least one synchronisation signal block from at least one of the reference neighbouring cells comprises:
determining at least one measurement gap offset allowing the at least one terminal served by the serving cell to measure as many synchronisation signal blocks as possible within at least one synchronisation signal block burst from at least one of the reference neighbouring cells; and
wherein adjusting the measurement gap configuration to comprise the at least one measurement gap offset is allowing the at least one terminal served by the serving cell to measure as many synchronisation signal blocks as possible within at least one synchronisation signal block burst from at least one of the reference neighbouring cells.

5. The apparatus of claim 4, wherein the at least one memory is storing instructions that when executed by the at least one processor, cause the apparatus at least to:
determine a first set of measurement gap offsets based on a set of all possible measurement gap offsets to measure a synchronisation signal block burst from at least one of the reference neighbouring cells;
provide, to one of the at least one terminal served by the serving cell, the first set of measurement gap offsets; and
receive, from the one of the at least one terminal served by the serving cell, an indication of at least a first measurement gap offset among the first set of measurement gap offsets allowing the one of the at least one terminal served by the serving cell to measure at least one first synchronisation signal block within at least one synchronisation signal block burst from at least one of the reference neighbouring cells.

6. The apparatus of claim 5, wherein the first set of measurement gap offsets comprises the set of all possible measurement gap offsets to measure at least one synchronisation signal block burst from at least one of the reference neighbouring cell.

7. The apparatus of claim 5, wherein the first set of measurement gap offsets comprises part of the set of all possible measurement gap offsets to measure at least one synchronisation signal block burst from at least one of the reference neighbouring cells.

8. The apparatus of claim 7, wherein the at least one memory is storing instructions that when executed by the at least one processor, cause the apparatus at least to:
determine the first set of measurement gap offsets based on a synchronisation signal block burst repetition period and a measurement gap offset step.

9. The apparatus of claim 8, wherein the at least one memory is storing instructions that when executed by the at least one processor, cause the apparatus at least to:
determine the measurement gap offset step based on a synchronisation signal block burst overall duration and a measurement gap length.

10. The apparatus of claim 9, wherein the at least one memory is storing instructions that when executed by the at least one processor, cause the apparatus at least to:
determine the measurement gap offset step so that the synchronisation signal block burst overall duration plus the measurement gap offset step is lower than or equal to the measurement gap length.

11. The apparatus of claim 5, wherein the at least one memory is storing instructions that when executed by the at least one processor, cause the apparatus at least to:
determine a second set of measurement gap offsets based on the first set of measurement gap offsets and the at least one first measurement gap offset;
provide, to one of the at least one terminal served by the serving cell, the second set of measurement gap offsets; and
receive, from the one of the at least one terminal served by the serving cell, an indication of at least one second measurement gap offset among the second set of measurement gap offsets allowing the one of the at least one terminal served by the serving cell to measure at least one second synchronisation signal block within at least one synchronisation signal block burst from at least one of the reference neighbouring cells.

12. The apparatus of claim 11, wherein the second set of measurement gap offsets comprises the at least one first measurement gap offset and at least one other measurement gap offset in the first set of measurement gap offsets.

13. The apparatus of claim 12, wherein at least one of the reference neighbouring cells is configured to transmit at least one synchronisation signal block associated with an omnidirectional or sectorial beam within at least one synchronisation signal block burst.

14. The apparatus of claim 13, wherein determining the measurement gap configuration allowing the at least one terminal served by the serving cell to measure at least one synchronisation signal block from at least one of the reference neighbouring cells comprises:
determining at least one measurement gap offset allowing the at least one terminal served by the serving cell to measure as many synchronisation signal blocks as possible is performed within at least one synchronisation signal block burst from at least one of the reference neighbouring cells and as many synchronisation signal blocks as possible within at least one synchronisation signal block burst from at least one non reference neighbouring cell overlapping in time with the at least one synchronisation signal block burst from the at least one of the reference neighbouring cells.

15. The apparatus of claim 14, wherein determining the measurement gap configuration allowing the at least one terminal served by the serving cell to measure at least one synchronisation signal block from at least one of the reference neighbouring cells comprises:
determining at least one measurement gap offset allowing the at least one terminal served by the serving cell to measure as many synchronisation signal blocks as possible within at least one synchronisation signal block burst from at least one of the reference neighbouring cells and as many synchronisation signal blocks as possible within at least one synchronisation signal block burst from at least one non reference neighbouring cell.

16. The apparatus of claim 15, wherein at least one non-reference neighbouring cell is configured to transmit at least one synchronisation signal block associated with an omnidirectional or sectorial beam within at least one synchronisation signal block burst from the at least one non-reference neighbouring cell, the at least one synchronisation signal block associated with the omnidirectional or sectorial beam overlapping in time with at least one synchronisation signal block burst from at least one of the reference neighbouring cells.

17. The apparatus of claim 16, wherein determining a measurement gap configuration allowing the at least one terminal served by the serving cell to measure at least one synchronisation signal block from the at least one reference neighbouring cell comprises:
determining at least one measurement gap offset allowing the at least one terminal served by the serving cell to measure as many synchronisation signal blocks as possible within at least one synchronisation signal block burst from at least one of the reference neighbouring cells and the at least one synchronisation signal block associated with the omnidirectional or sectorial beam within at least one synchronisation signal block burst from the at least one non-reference neighbouring cell.

18. An apparatus comprising:
at least one processor; and
at least one memory including computer program code;
the at least one memory storing instructions that when executed by the at least one processor, cause the apparatus at least to:
receive, from a base station providing a serving cell, a measurement gap configuration allowing at least one terminal served by the serving cell to measure at least one synchronisation signal block from at least one of reference neighbouring cells selected among a plurality of neighbouring cells; and
use the measurement gap configuration to measure at least one synchronisation signal block from at least one of the reference neighbouring cells.

19. The apparatus of claim 18, wherein the at least one memory is storing instructions that when executed by the at least one processor, cause the apparatus at least to:
receive, from the base station, a first set of measurement gap offsets determined based on a set of all possible measurement gap offsets to measure at least one synchronisation signal block from at least one of the reference neighbouring cells; and
provide, to the base station, an indication of at least one first measurement gap offset among the first set of measurement gap offsets allowing the apparatus to measure at least one first synchronisation signal block within at least one synchronisation signal block burst from at least one of the reference neighbouring cells.

20. The apparatus of claim 18, wherein the at least one memory is storing instructions that when executed by the at least one processor, cause the apparatus at least to:
receive, from the base station, a second set of measurement gap offsets determined based on the first set of measurement gap offsets and the at least one first measurement gap offset; and
provide, to the base station, an indication of at least one second measurement gap offset among the second set of measurement gap offsets allowing the apparatus to measure at least one second synchronisation signal block within at least one synchronisation signal block burst from at least one of the reference neighbouring cells.

21. A method comprising:
selecting reference neighbouring cells among a plurality of neighbouring cells of a serving cell, wherein the reference neighboring cells have a same cell numerology and synchronization signal block burst patterns overlapping in time and with a same periodicity;
determining a measurement gap configuration allowing at least one terminal served by the serving cell to measure at least one synchronisation signal block from at least one of the reference neighbouring cells; and
providing, to the at least one terminal, the measurement gap configuration.

22. A method comprising:
receiving, from a base station providing a serving cell, a measurement gap configuration allowing at least one terminal served by the serving cell to measure at least one synchronisation signal block from at least one of reference neighbouring cells selected among a plurality of neighbouring cells; and
using the measurement gap configuration to measure at least one synchronisation signal block from at least one of the reference neighbouring cells.

23. A computer program comprising computer executable instructions which when run on one or more processors perform the steps of the method of claim 22.

* * * * *